(12) United States Patent
Lu

(10) Patent No.: US 10,349,238 B2
(45) Date of Patent: Jul. 9, 2019

(54) METHOD AND APPARATUS FOR PROVIDING SERVICE PROVIDER IDENTITY, ACCESS DEVICE AND TERMINAL DEVICE

(71) Applicant: BAICELLS TECHNOLOGIES CO. LTD., Beijing (CN)

(72) Inventor: Yang Lu, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 0 days.

(21) Appl. No.: 16/079,939

(22) PCT Filed: Feb. 24, 2017

(86) PCT No.: PCT/CN2017/074668
§ 371 (c)(1),
(2) Date: Aug. 24, 2018

(87) PCT Pub. No.: WO2017/144000
PCT Pub. Date: Aug. 31, 2017

(65) Prior Publication Data
US 2019/0110170 A1  Apr. 11, 2019

(30) Foreign Application Priority Data
Feb. 26, 2016 (CN) .......................... 2016 1 0108699

(51) Int. Cl.
*H04W 4/00* (2018.01)
*H04W 4/18* (2009.01)
(Continued)

(52) U.S. Cl.
CPC ............. *H04W 4/18* (2013.01); *H04W 48/10* (2013.01); *H04W 60/00* (2013.01); *H04W 68/005* (2013.01)

(58) Field of Classification Search
CPC ....... H04W 4/18; H04W 48/10; H04W 60/00; H04W 68/005
(Continued)

(56) References Cited

U.S. PATENT DOCUMENTS

| 2005/0113083 A1 | 5/2005 | Florkey et al. |
| 2008/0170524 A1 | 7/2008 | Dang et al. |

(Continued)

FOREIGN PATENT DOCUMENTS

| CN | 1620049 A | 5/2005 |
| CN | 1801755 A | 7/2006 |

(Continued)

OTHER PUBLICATIONS

International Search Report and Written Opinion for International Application No. PCT/CN/2017/074668, dated Apr. 27, 2017 (Apr. 27, 2017)—17 pages.

*Primary Examiner* — Amancio Gonzalez
(74) *Attorney, Agent, or Firm* — Culhane Meadows PLLC; Stephen J. Weed

(57) ABSTRACT

The present disclosure provides a method and apparatus for providing service provider identity, an access device and a terminal device. The method includes: determining a second-format second participating service provider identity (PSP-ID) corresponding to a first-format first PSP-ID of a service provider to be accessed; obtaining a second-format third PSP-ID sent from a first access device; when the third PSP-ID includes the second PSP-ID, selecting the first access device to access the service provider; or, obtaining the second-format third PSP-ID sent from the first access device, determining a first-format fourth PSP-ID that is supported by the first access device and is corresponding to
(Continued)

the third PSP-ID; when the fourth PSP-ID includes the first PSP-ID, selecting the first access device to access the service provider.

19 Claims, 15 Drawing Sheets

(51) Int. Cl.
*H04W 60/00* (2009.01)
*H04W 68/00* (2009.01)
*H04W 48/10* (2009.01)

(58) Field of Classification Search
USPC .......................................................... 455/434
See application file for complete search history.

(56) References Cited

U.S. PATENT DOCUMENTS

| | | | |
|---|---|---|---|
| 2012/0011228 A1 | 1/2012 | Corda et al. | |
| 2017/0311243 A1* | 10/2017 | Rinne | H04W 48/18 |
| 2018/0368209 A1* | 12/2018 | Zhou | H04W 4/12 |
| 2018/0376411 A1* | 12/2018 | Rinne | H04W 76/27 |
| 2019/0090166 A1* | 3/2019 | Lu | H04W 36/0033 |

FOREIGN PATENT DOCUMENTS

| | | |
|---|---|---|
| CN | 102356626 A | 2/2012 |
| EP | 1246480 A1 | 10/2002 |

* cited by examiner

METHOD AND APPARATUS FOR PROVIDING SERVICE PROVIDER IDENTITY, ACCESS DEVICE AND TERMINAL DEVICE

CROSS-REFERENCE TO RELATED APPLICATION

The present application is the U.S. national phase of PCT Application No. PCT/CN2017/074668 filed on Feb. 24, 2017, which claims a priority to Chinese Patent Application No. 201610108699.2 filed on Feb. 26, 2016, the disclosure of which is incorporated in its entirety by reference herein.

TECHNICAL FIELD

The present disclosure relates to the field of communication technology, and in particular to a method and apparatus for providing service provider identity, an access device and a terminal device.

BACKGROUND

MulteFire is a novel wireless access technology based on long term evolution (LTE), and this technology can be independently operated in an unlicensed spectrum without authorized frequency band carriers. MulteFire extends LTE into the unlicensed spectrum, and the physical layer introduces a Listen Before Talk (LBT) mechanism that is similar to wireless-fidelity (WiFi), to realize fair competition for air interface resources with unlicensed frequency band equipment.

MulteFire may be used in the existing 3rd Generation Partnership Project (3GPP) network architecture to interface with the existing 3GPP core network to provide capacity, coverage and data offload from unlicensed spectrum for traditional mobile network operators and improve the service quality of the traditional operators with supplemental authorized spectrum or hotspots.

Meanwhile, MulteFire also introduces new network architecture, provides a unified planning and self-organizing Neutral Host network. Service providers, equipment vendors or users may participate in network deployment. The network deployed by anyone can serve various service providers which include an internet service provider, a cable TV and mobile network operator, an enterprise and a public place service provider, and may provide authentication and network access for a terminal device without a subscriber Identity Module (SIM) card.

Currently, an alliance organization for promoting MulteFire has been established and operated to promote the development of MulteFire's global technology specifications, to promote the future evolution of MulteFire and to ensure that MulteFire devices and other devices (such as WiFi devices) in the unlicensed spectrum compete fairly for unlicensed spectrum resources.

At present, two network modes of MulteFire are divided into Evolved Packet Core Network (EPC) connection mode and Neutral Host (NH) mode. As shown in FIG. 1 and FIG. 2, the NH mode is a network mode in which MulteFire (MF) Radio Access Network (RAN) and the MF core network (CN) are connected. MF CN is a unified plan and self-organizing neutral network which is newly introduced by MulteFire, and does not support RAN-level switching with the 3 GPP network. The EPC connection mode is a network mode in which the MF RAN interfaces with the existing 3GPP core network, and the UE can perform S1 and X2 handover between the MF RAN and the 3GPP RAN, as shown in FIG. 3. The access layer physical layer technologies of the above two networks adopt LTE but introduce an LBT-based listening mechanism different from LTE.

In the NH mode of MulteFire, in order to support a variety of service providers, including the internet service provider, the cable TV and mobile network operator, the enterprise and the public place service provider, Participating Service Provider Identity (PSP-ID) is introduced. The MF RAN can be provided to one or more service providers. The MulteFire network determines certification, authentication or accounting server of the UE through the PSP-ID. The PSP-ID is divided into two types including a short-format PSP-ID and a long-format PSP-ID. In order to save air interface resources, the RAN system broadcast transmits only the short-format PSP-ID supported by the MF RAN.

In carrying out the process of the present disclosure, the inventor has found that at least the following problems exist in the related art: the short-format PSP-ID transmitted in the system broadcast is a simplified service provider identifier, which may only indicate a service provider vaguely. The long-format PSP-ID is the actual service provider identity. The UE needs to obtain the long-format PSP-ID actually supported by the MF RAN to determine whether the MF RAN supports the designated service provider. However, there is no mechanism in the related art for the UE to know the long-format PSP-ID supported by the MF access device.

SUMMARY

One technical problem to be solved by the present disclosure is to provide a method and apparatus for providing service provider identity, an access device and a terminal device, to enable the UE to know long-format PSP-IDs supported by the MF access device and improve network access success rate.

According to a first aspect of the present disclosure, a method for providing service provider identity is provided and may be applied to a user equipment (UE). The method includes: determining a second-format second participating service provider identity (PSP-ID) corresponding to a first-format first PSP-ID of a service provider to be accessed; obtaining a second-format third PSP-ID sent from a first access device; when the third PSP-ID includes the second PSP-ID, selecting the first access device to access the service provider; or, obtaining the second-format third PSP-ID sent from the first access device, determining a first-format fourth PSP-ID that is supported by the first access device and is corresponding to the third PSP-ID; when the fourth PSP-ID includes the first PSP-ID, selecting the first access device to access the service provider.

According to a second aspect of the present disclosure, a method for providing service provider identity is provided and may be applied to an access device. The method includes: determining a second-format second participating service provider identity (PSP-ID) corresponding to a first-format first PSP-ID of a service provider supported by the access device; and sending the second PSP-ID to a user equipment (UE) connected with the access device.

According to a third aspect of the present disclosure, an apparatus for providing service provider identity is provided and may be applied to a user equipment (UE). The apparatus includes: a first determination module configured to determine a second-format second participating service provider identity (PSP-ID) corresponding to a first-format first PSP-ID of a service provider to be accessed; a first selection module configured to obtain a second-format third PSP-ID sent from a first access device; when the third PSP-ID includes the second PSP-ID, select the first access device to access the service provider; and/or, a second selection module configured to obtain the second-format third PSP-ID sent from the first access device, determine a first-format fourth PSP-ID that is supported by the first access device and is corresponding to the third PSP-ID; when the fourth PSP-ID includes the first PSP-ID, select the first access device to access the service provider.

According to a fourth aspect of the present disclosure, a user equipment is provided and includes the above the apparatus.

According to a fifth aspect of the present disclosure, an apparatus for providing service provider identity is applied and may be applied to an access device. The apparatus includes: a second determination module configured to determine a second-format second participating service provider identity (PSP-ID) corresponding to a first-format first PSP-ID of a service provider supported by the access device; and a sending module configured to send the second PSP-ID to a user equipment (UE) connected with the access device.

According to a sixth aspect of the present disclosure, an access device is provided and includes the above apparatus.

The beneficial effects of the above technical solutions of the present disclosure are as follows: the UE first determines the short-format PSP-ID corresponding to a long-format PSP-ID to be accessed; when one short-format PSP-ID sent from the access device (also referred as MF access device) includes the short-format PSP-ID corresponding to the long-format PSP-ID to be accessed, then it is preliminarily determined that the access device may be selected to access the network. Subsequently, the UE may access this access device again to obtain the long-format PSP-IDs actually supported by the access device, and then determines whether the long-format PSP-IDs actually supported by the access device include the long-format PSP-ID to be accessed. If yes, the UE continues to access the above access device; otherwise, the UE reselects another access device to access the network.

When the short-format PSP-ID sent from the access device is obtained from the received system broadcast message, the UE may initially select the access device that supports the long-format PSP-ID to be accessed, and this facilitates the UE to narrow a selection range of access devices and improves network access success rate. After the UE initially selects the access device, the UE may obtain the long-format PSP-IDs actually supported by the base station, and match the long-format PSP-IDs actually supported by the access device with the long-format PSP-ID to be accessed, and finally select one matched access device for access, thereby further improving network access success rate. This embodiment can effectively avoid signaling overhead caused by network rejection when the UE requests access to the long-format PSP-ID that the network does not support.

DETAILED DESCRIPTION

The technical solutions of embodiments of the present disclosure will be described hereinafter in a clear and complete manner in conjunction with the drawings and embodiments. Obviously, the following embodiments are merely a part of, rather than all of, the embodiments of the present disclosure, and based on these embodiments, a person skilled in the art may obtain the other embodiments, which also fall within the scope of the present disclosure.

In embodiments of the present disclosure, one or more first-format PSP-IDs of a service provider may correspond one second-format PSP-ID, and a length of the second-format PSP-ID is less than that of the first-format PSP-ID. The first-format may also be referred as long-format, and the second-format may also be referred as sort-format. As an example of that the length of the second-format PSP-ID is less than that of the first-format PSP-ID, PSP-IDs of a service provider Alibaba includes "Alibaba Group", "Alibaba Shop" and "Alibaba", "Alibaba Group" as well as "Alibaba Shop" are long-format PSP-IDs, and "Alibaba" is a short-format PSP-ID. It should be noted that, the service provider may be internet service providers, cable TV and mobile network operators, corporate and public space service providers, etc., which are not limited to these.

In embodiments of the present disclosure, user equipment (UE) may be a mobile phone (or cell phone), or other devices that can transmit or receive wireless signals, including a user device (terminal), a personal digital assistant (PDA), a wireless modem, a wireless communication device, a handheld device, a laptop computer, a cordless telephone, a wireless local loop (WLL) station, customer premise equipment (CPE) or a mobile intelligent hotspot that can convert mobile signals to WiFi signals, smart appliances, or other devices that can communicate with mobile communication network spontaneously without human operation.

In embodiments of the present disclosure, an access device (which may also be referred as MF access device) may be a base station. Of course, it should be understood that the above base station may be in a variety of forms, may be a Macro Base Station, a Pico Base Station, a Node B (which is the name of name of the 3G mobile base station), an enhanced base station (ENB), a Home enhanced base station (Femto eNB, Home eNode B, Home eNB or HNEB), a relay station, an access point, a Remote Radio Unit (RRU), a Remote Radio Head (RRH).

First Embodiment

Figure 1:
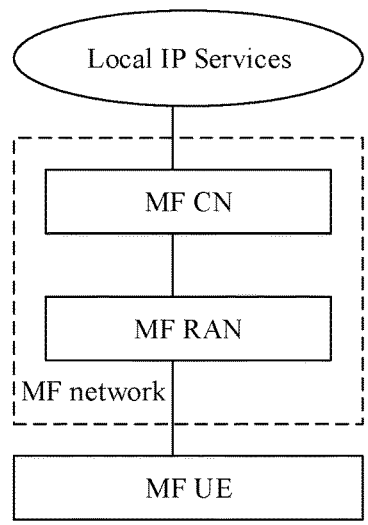
FIG. 1 is an architecture diagram of an MF network in an NH mode in the related art.
Figure 2:
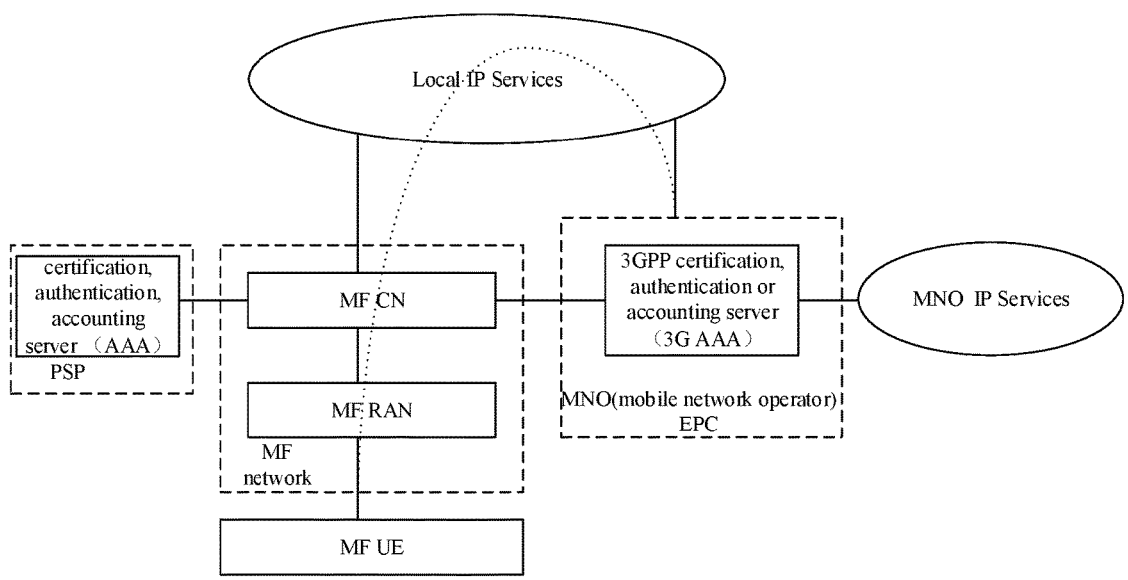
FIG. 2 is another architecture diagram of an MF network in an NH mode in the related art.
Figure 3:
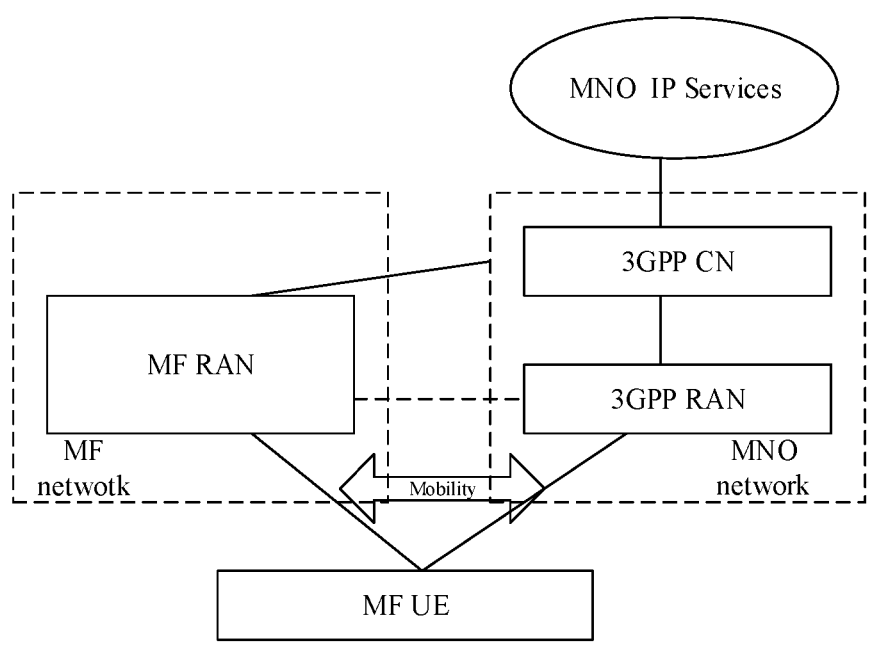
FIG. 3 is an architecture diagram of an MF network in an EPC mode in the related art.
Figure 4:
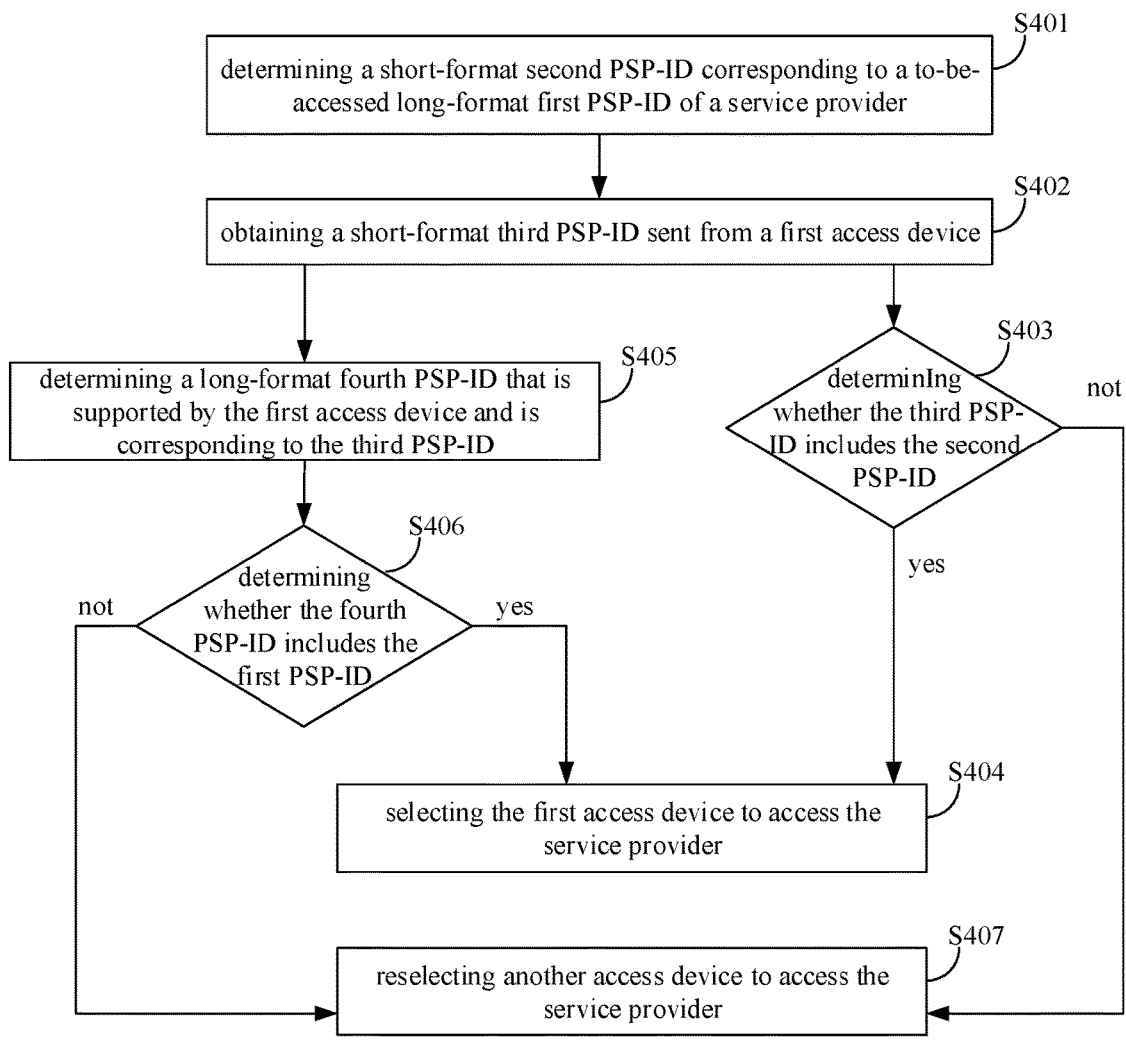
FIG. 4 is a flow chart of a method for providing service provider identity according to a first embodiment of the present disclosure.

Referring to FIG. 4, which shows a flow chart of a method for providing service provider identity, the method may be executed by an execution body such as a user equipment, and specifically includes the following steps.

The step S401 is to determine a short-format second PSP-ID corresponding to a to-be-accessed long-format first PSP-ID of a service provider, and then proceed to step S402.

Optionally, in this embodiment, the UE may determine the short-format second PSP-ID in the following four ways.

First way, the UE obtains mapping relationship between a long-format PSP-ID and a short-format PSP-ID of a service provider from the network; then, based on the mapping relationship, the UE determines the short-format second PSP-ID corresponding to the long-format first PSP-ID of the service provider to be accessed by the UE. It should be noted that, in order to save radio resources, one or more long-format PSP-IDs of the service provider may correspond one short-format PSP-ID. For example, two long-format PSP-IDs including "Alibaba Group" and "Alibaba Shop" are corresponding to one short-format PSP-ID, i.e., "Alibaba".

Second way, based on unified algorithm agreed by the network (such as the MulteFire network), the UE may calculate the short-format second PSP-ID corresponding to the long-format first PSP-ID of the service provider to be accessed by the UE. For example, the unified algorithm agreed by the MulteFire network may be the Hash algorithm. Of course, specific algorithms are not limited in this embodiment.

Third way, a corresponding short-format second PSP-ID may be generated based on a value extracted from a specified position of the long-format first PSP-ID of the service provider to be accessed by the UE. It should be noted that, the above specified position is not limited in this embodiment.

Fourth way, a specified portion (for example, the front portion) of the long-format first PSP-ID of the service provider to be accessed by the UE is taken as the corresponding short-format second PSP-ID. It should be noted that, the above specified portion is not limited in this embodiment.

Of course, in actual implementation, the second PSP-ID may also be determined in other way in addition to the above four ways.

The step S402 is to obtain a short-format third PSP-ID sent from a first access device; and then proceed to step S403 or S405.

Optionally, the UE receives a notification message (i.e., a system broadcast message) sent from the first access device (i.e., a base station), and the notification message carries the short-format third PSP-ID sent from the first access device.

The step S403 is to determine whether the third PSP-ID includes the second PSP-ID; if yes, proceed to step S404; otherwise, proceed to step S407.

The step S404 is to select the first access device to access the service provider.

When the UE receives the system broadcast message sent from the first access device, the UE may determine whether the system broadcast message includes the short-format second PSP-ID determined in the step S401, if yes, select the first access device to access the service provider.

The step S405 is to determine a long-format fourth PSP-ID that is supported by the first access device and is corresponding to the third PSP-ID, and then proceed to step S406.

The step S406 is to determine whether the fourth PSP-ID includes the first PSP-ID; if yes, proceed to step S404 otherwise, proceed to step S407.

When the UE obtains the mapping relationship between the long-format PSP-ID and the short-format PSP-ID of the service provider in the step S401, then after the UE obtains the short-format third PSP-ID sent from the first access device in the step S402, the UE may determine the long-format fourth PSP-ID that is supported by the first access device according to the mapping relationship between the long-format PSP-ID and the short-format PSP-ID. When the fourth PSP-ID that is supported by the access device includes the long-format first PSP-ID of the service provider to be accessed by the UE, the UE selects the first access device to access the service provider.

The step S407 is to reselect another access device to access the service provider.

In this embodiment, the UE first determines the short-format PSP-ID corresponding to a to-be-accessed long-format PSP-ID; when one short-format PSP-ID sent from the access device includes the short-format PSP-ID corresponding to the to-be-accessed long-format PSP-ID, then it is preliminarily determined that the access device may be selected to access the network, thereby enabling the UE to obtain the long-format PSP-ID. When the short-format PSP-ID sent from the access device is obtained from the received system broadcast message, the UE may initially select the access device that supports the long-format PSP-ID to be accessed, and this facilitates the UE to narrow a selection range of access devices.

Second Embodiment

Figure 5:
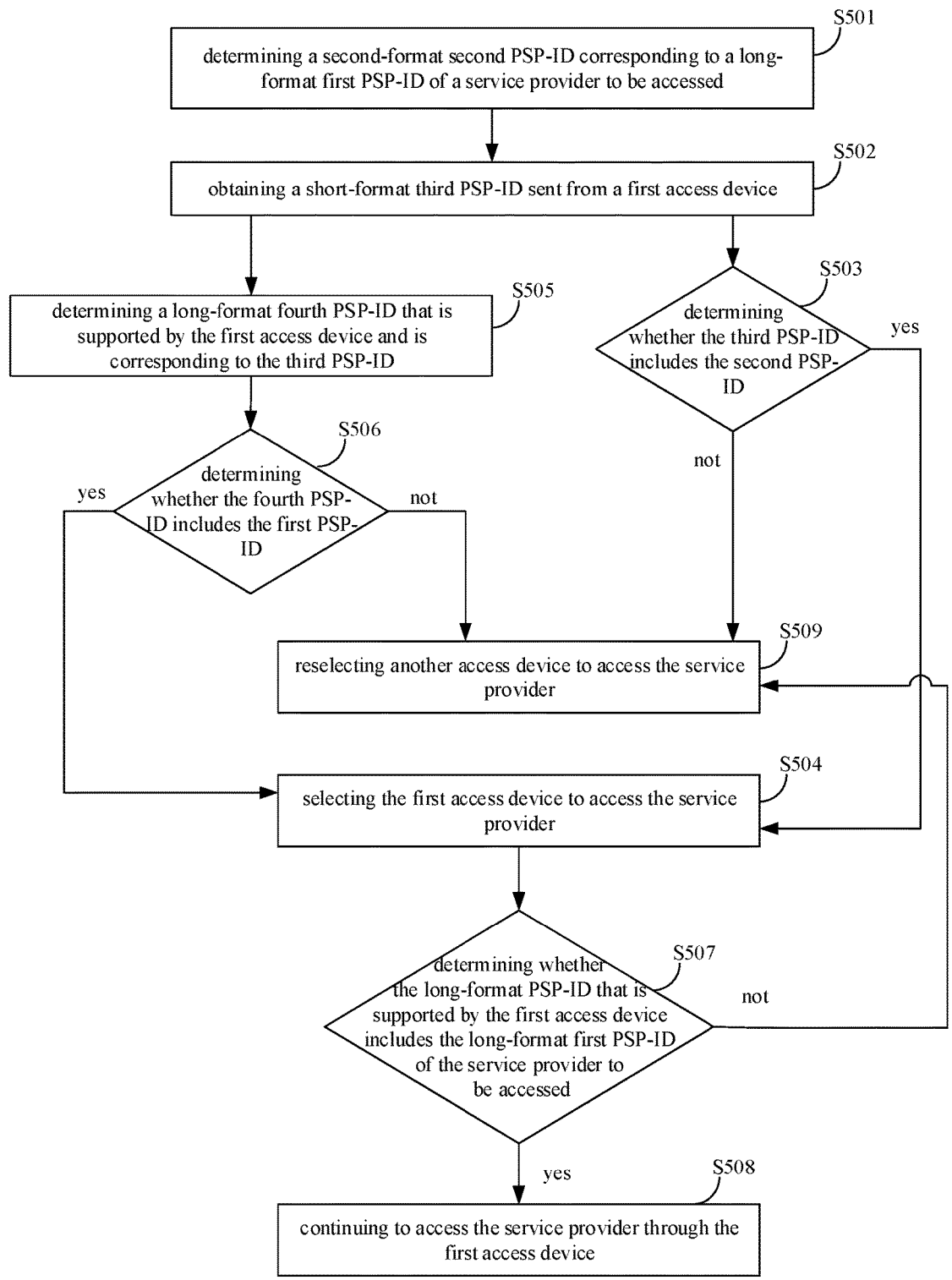
FIG. 5 is a flow chart of a method for providing service provider identity according to a second embodiment of the present disclosure.

Referring to FIG. 5, which shows a flow chart of a method for providing service provider identity, the method may be executed by an execution body such as a user equipment, and specifically includes the following steps.

The step S501 is to determine a second-format second PSP-ID corresponding to a long-format first PSP-ID of a service provider to be accessed, and then proceed to step S502.

Optionally, in this embodiment, the UE may determine the short-format second PSP-ID in the following four ways.

First way, the UE obtains mapping relationship between a long-format PSP-ID and a short-format PSP-ID of a service provider from the network; then, based on the mapping relationship, the UE determines the short-format second PSP-ID corresponding to the long-format first PSP-ID of the service provider to be accessed by the UE. It should be noted that, in order to save radio resources, one or more long-format PSP-IDs of the service provider may correspond one short-format PSP-ID. For example, two long-format PSP-IDs including "Alibaba Group" and "Alibaba Shop" are corresponding to one short-format PSP-ID, i.e., "Alibaba".

Second way, based on unified algorithm agreed by the network (such as the MulteFire network), the UE may calculate the short-format second PSP-ID corresponding to the long-format first PSP-ID of the service provider to be accessed by the UE. For example, the unified algorithm agreed by the MulteFire network may be the Hash algorithm. Of course, specific algorithms are not limited in this embodiment.

Third way, a corresponding short-format second PSP-ID may be generated based on a value extracted from a specified position of the long-format first PSP-ID of the service provider to be accessed by the UE. It should be noted that, the above specified position is not limited in this embodiment.

Fourth way, a specified portion (for example, the front portion of the first PSP-ID) of the long-format first PSP-ID of the service provider to be accessed by the UE is taken as the corresponding short-format second PSP-ID. It should be noted that, the above specified portion is not limited in this embodiment.

Of course, in actual implementation, the second PSP-ID may also be determined in other way in addition to the above four ways.

The step S502 is to obtain a short-format third PSP-ID sent from a first access device; and then proceed to step S503 or S505.

Optionally, the UE receives a notification message (i.e., a system broadcast message) sent from the first access device (i.e., a base station), and the notification message carries the short-format third PSP-ID sent from the first access device.

The step S503 is to determine whether the third PSP-ID includes the second PSP-ID; if yes, proceed to step S504; otherwise, proceed to step S509.

The step S504 is to select the first access device to access the service provider, and then proceed to step S507.

When the UE receives the system broadcast message sent from the first access device, the UE may determine whether the system broadcast message includes the short-format second PSP-ID determined in the step S501, if yes, select the first access device to access the network.

The step S505 is to determine a long-format fourth PSP-ID that is supported by the first access device and is corresponding to the third PSP-ID, and then proceed to step S506.

The step S506 is to determine whether the fourth PSP-ID includes the first PSP-ID; if yes, proceed to step S504 otherwise, proceed to step S509.

When the UE obtains the mapping relationship between the long-format PSP-ID and the short-format PSP-ID of the service provider in the step S501, then after the UE obtains the short-format third PSP-ID sent from the first access device in the step S502, the UE may determine the long-format fourth PSP-ID that is supported by the first access device according to the mapping relationship between the long-format PSP-ID and the short-format PSP-ID. When the fourth PSP-ID that is supported by the access device includes the long-format first PSP-ID of the service provider to be accessed by the UE, the UE selects the first access device to access the service provider.

The step S507 is to determine whether the long-format PSP-ID that is supported by the first access device includes the long-format first PSP-ID of the service provider to be accessed; if yes, proceed to step S508; otherwise, proceed to step S509.

It should be noted that, after obtaining the short-format PSP-ID corresponding to the long-format PSP-ID supported by the first access device, the first access device sends one or more short-format PSP-IDs in the system broadcast message. In actual implementation, the first access device may support all long-format PSP-IDs corresponding to the short-format PSP-ID sent from the first access device in the system broadcast message, or may not support all long-format PSP-IDs corresponding to the short-format PSP-ID in the system broadcast message. Thus, after it is preliminarily determined that the first access device may support the long-format PSP-ID to be accessed by the UE, the UE may further determine whether long-format PSP-IDs actually supported by the first access device include the long-format PSP-ID to be accessed.

The step S508 is to continue to access the service provider through the first access device.

The step S509 is to reselect another access device to access the service provider.

In this embodiment, the UE first determines the short-format PSP-ID corresponding to a to-be-accessed long-format PSP-ID; when one short-format PSP-ID sent from the access device includes the short-format PSP-ID corresponding to the to-be-accessed long-format PSP-ID, then it is preliminarily determined that the access device may be selected to access the network. Subsequently, the UE may access this access device again to obtain the long-format PSP-IDs actually supported by the access device, and then determines whether the long-format PSP-IDs actually supported by the access device include the long-format PSP-ID to be accessed. If yes, the UE continues to access the above access device; otherwise, the UE reselects another access device to access the network.

When the short-format PSP-ID sent from the access device is obtained from the received system broadcast message, the UE may initially select the access device that supports the long-format PSP-ID to be accessed, and this facilitates the UE to narrow a selection range of access devices and improves network access success rate. After the UE initially selects the access device, the UE may obtain the long-format PSP-IDs actually supported by the access device, and match the long-format PSP-IDs actually supported by the access device with the long-format PSP-ID to be accessed, and finally select one matched access device for access, thereby further improving network access success rate. This embodiment can effectively avoid signaling overhead caused by network rejection when the UE requests access to the long-format PSP-ID that the network does not support.

Third Embodiment

The same content as the above embodiment is not elaborated in this embodiment. This embodiment illustrates how to obtain the mapping relationship between a long-format PSP-ID and a short-format PSP-ID of a service provider. One specific way is described hereinafter. When the UE accesses the network for the first time, the UE is registered using a network-supported, long-format fifth PSP-ID (which is also referred to as public long-format PSP-ID) of the service provider to be accessed, and then logs in to a server (i.e., PSP-ID configuration server) to obtain mapping relationship between a long-format PSP-ID and a short-format PSP-ID. After obtaining the mapping relationship, the UE logs out from the network corresponding to the fifth PSP-ID, and re-selects another access device to access network.

Figure 6:
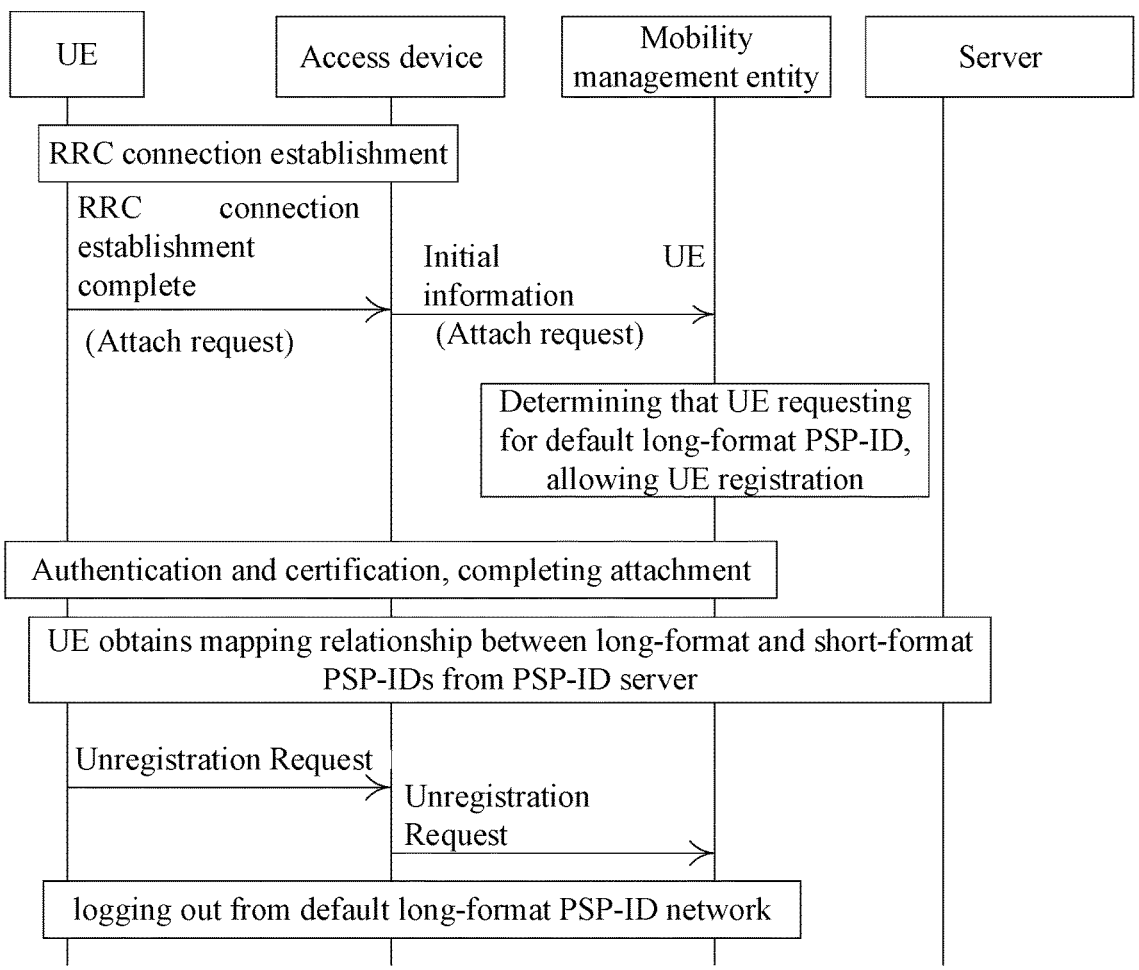
FIG. 6 is a sequence diagram showing that UE obtains mapping relationship between a long-format PSP-ID and a short-format PSP-ID from the network according to a third embodiment of the present disclosure.

Referring to FIG. 6, FIG. 6 is a sequence diagram showing that UE obtains mapping relationship between a long-format PSP-ID and a short-format PSP-ID from the network. When the UE accesses the network for the first time, the UE initiates random access to a base station and transmits an RRC connection setup request. The UE does not obtain mapping relationship between a long-format PSP-ID and a short-format PSP-ID, thus, when the UE accesses the network for the first time, the UE does not determine whether the base station supports the long-format PSP-ID to be accessed by the UE according to the short-format PSP-ID in the system broadcast message. When the RRC connection is established, an attach request NAS (non-access layer) message sent from the UE to a mobility management entity (MME) carries a public long-format PSP-ID requested to access. The public long-format PSP-ID is a long-format PSP-ID supported by the MulteFire network by default. After the MME receives the attachment request sent from the UE, the MME obtains the long-format PSP-ID requested by the UE, and then completes authentication and authentication and allows UE registration.

After the UE is registered using the public long-format PSP-ID, the UE may log in to a server (i.e., PSP-ID configuration server) to download the mapping relationship between a long-format PSP-ID and a short-format PSP-ID, and then log out from the network corresponding to the public long-format PSP-ID. Then, the UE re-selects another access device to access network. Specifically, the process is as follows. After the UE receives a system broadcast message sent from one access device, the UE obtains a short-format PSP-ID sent from the one access device. Then, based on the previously downloaded mapping relationship between the long-format PSP-ID and the short-format PSP-ID, the UE may determine long-format PSP-IDs that are supported by the one access device. When the long-format PSP-IDs that are supported by the base station include the long-format PSP-ID of the service provider to be accessed by the UE, then it is determined that the one access device can be selected to access the network.

In this embodiment, when the short-format PSP-ID sent from the base station is obtained from the received system broadcast message, the UE may initially select the access device that supports the long-format PSP-ID to be accessed, and this facilitates the UE to narrow a selection range of access devices and improves network access success rate. After the UE initially selects the access device, the UE may obtain the long-format PSP-IDs actually supported by the base station, and match the long-format PSP-IDs actually supported by the access device with the long-format PSP-ID to be accessed, and finally select one matched access device for access, thereby further improving network access success rate. This embodiment can effectively avoid signaling overhead caused by network rejection when the UE requests access to the long-format PSP-ID that the network does not support.

Fourth Embodiment

The same content as the above embodiment is not elaborated in this embodiment. This embodiment provides one way for using an NAS message to obtain mapping relationship between a long-format PSP-ID and a short-format PSP-ID of a service provider. The specific way is as follows. After the UE selects the first access device, the UE sends a second connection establishment request message to the first access device; when wireless connection with the first access device is completed, the UE sends a second attach request NAS message to a second mobility management entity corresponding to the first access device. The second attach request NAS message carries the long-format first PSP-ID of the service provider to be accessed. The UE receives an attachment accepting NAS message sent from the second mobility management entity. The attachment accepting NAS message includes the mapping relationship between the long-format PSP-ID and the short-format PSP-ID of the service provider. Or, the UE receives an attachment rejection NAS message sent from the second mobility management entity, and re-selects another access device to access the service provider. The attachment rejection NAS message includes the mapping relationship between the long-format PSP-ID and the short-format PSP-ID of the service provider.

Figure 7:
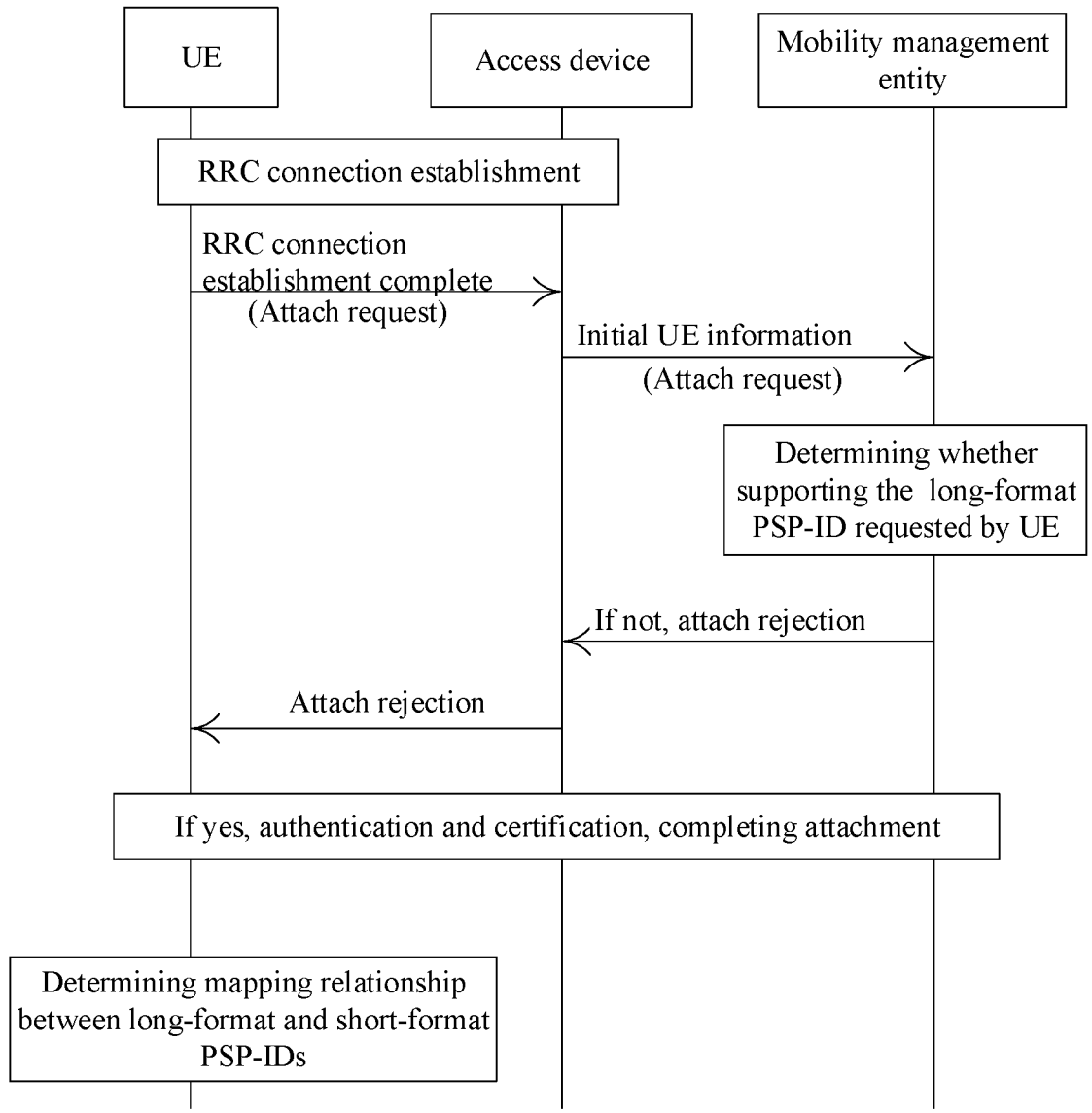
FIG. 7 is a sequence diagram showing that UE obtains mapping relationship between a long-format PSP-ID and a short-format PSP-ID through an NAS message according to a fourth embodiment of the present disclosure.

Referring to FIG. 7, after the UE selects the access device to access the network, the UE initiates random access to the access device and transmits an RRC connection setup request. The UE does not obtain mapping relationship between a long-format PSP-ID and a short-format PSP-ID, thus, when the UE selects the access device to access, the UE does not determine whether the access device supports the long-format PSP-ID to be accessed by the UE according to the short-format PSP-ID in the system broadcast message.

When the RRC connection is established, an attach request NAS message sent from the UE to the MME carries a long-format PSP-ID of the service provider requested to access and an identifier of whether to request the mapping relationship between the long-format PSP-ID and the short-format PSP-ID. After the MME receives the attach request sent from the UE, the MME obtains the long-format PSP-ID requested by the UE. When the MME does not support the long-format PSP-ID, the MME sends an attachment rejection (AttachReject) message to the UE with a refusal reason that the long-format PSP-ID is not supported. When the MME supports the long-format PSP-ID, the MME sends an attachment accepting (AttachAccept) message to the UE after the UE successfully authenticates.

When the MME determines that the attachment request message includes the identifier of requesting for the mapping relationship between the long-format PSP-ID and the short-format PSP-ID, the above attachment rejection (AttachReject) message or attachment accepting (AttachAccept) message includes the mapping relationship between the long-format PSP-ID and the short-format PSP-ID. A quantity of mapping relationships between long-format PSP-IDs and short-format PSP-IDs that can be transmitted by the MME may be limited, thus, the MME may only send or prioritize sending long-format PSP-IDs supported by the MME as well as corresponding short-format PSP-IDs.

When the UE receives the mapping relationship between the long-format PSP-ID and the short-format PSP-ID, if the attachment is rejected and the refusal reason is that the long-format PSP-ID is not supported, it means that the current base station does not support the long-format PSP-ID, then the UE re-selects another base station to access.

In this embodiment, when the short-format PSP-ID sent from the base station is obtained from the NAS message, the UE may initially select the access device that supports the long-format PSP-ID to be accessed, and this facilitates the UE to narrow a selection range of access devices and improves network access success rate. After the UE initially selects the base station, the UE may obtain the long-format PSP-IDs actually supported by the access device, and match the long-format PSP-IDs actually supported by the base station with the long-format PSP-ID to be accessed, and finally select one matched access device for access, thereby further improving network access success rate. This embodiment can effectively avoid signaling overhead caused by network rejection when the UE requests access to the long-format PSP-ID that the network does not support.

Fifth Embodiment

Figure 8:
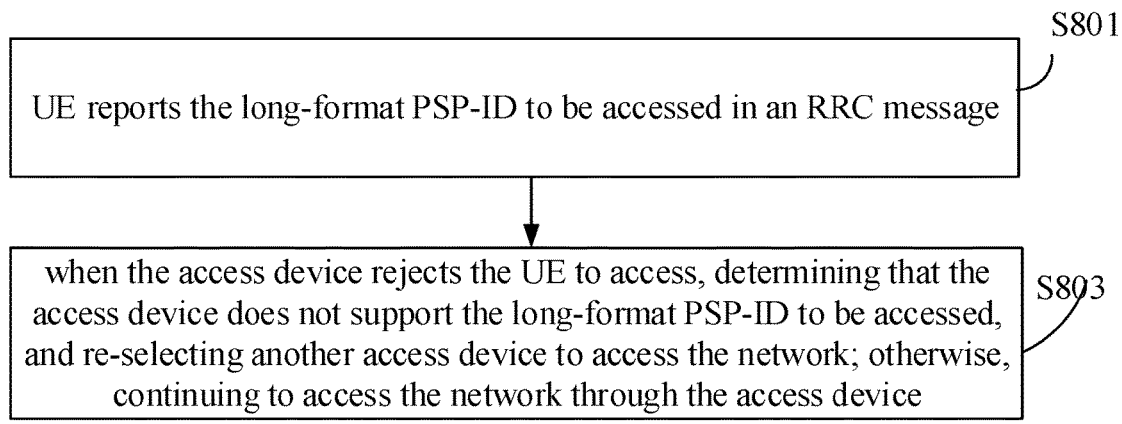
FIG. 8 is a flow chart of determining whether long-format PSP-IDs supported by an access device includes a to-be-accessed long-format PSP-ID and subsequently selecting one access device for accessing a network according to a fifth embodiment of the present disclosure.

The same content as the above embodiment is not elaborated in this embodiment. This embodiment provides one way about how a UE determines whether long-format PSP-IDs supported by the access device includes a to-be-accessed long-format PSP-ID and subsequently selects one access device to access a network. The specific way includes: sending a first PSP-ID of a service provider to be accessed to the first access device; according to whether the first access device allows the UE to access, determining whether long-format PSP-IDs supported by the first access device includes the first PSP-ID of the service provider to be accessed; when the first access device rejects the UE to access, determining that the long-format PSP-IDs supported by the first access device do not include the first PSP-ID; when the first access device allows the UE to access, determining that the long-format PSP-IDs supported by the first access device include the first PSP-ID. As shown in FIG. 8, this may include following steps.

At step S801, the UE reports the long-format PSP-ID to be accessed in an RRC message.

After it is preliminarily determined that the access device may support the long-format PSP-ID to be accessed by the UE, the UE initiates random access to the access device and initiates RRC connection establishment. The UE may report the long-format PSP-ID to be accessed through a specific RRC message in a competitive solution of the random access process, an RRC connection establishment request message or an RRC connection establishment complete message.

At step S802, when the access device rejects the UE to access, it is determined that the access device does not support the long-format PSP-ID to be accessed, and the UE re-selects another access device to access the network; otherwise, the UE continues to access the network through the access device.

The access device receives the long-format PSP-ID to be accessed reported by the UE, determines whether the long-format PSP-IDs supported by the access device include the received long-format PSP-ID. When it is determined that the long-format PSP-IDs supported by the access device do not include the above received long-format PSP-ID, the access device rejects the UE to access. When it is determined that the long-format PSP-IDs supported by the access device include the above received long-format PSP-ID, the access device allows the UE to access.

Figure 9:
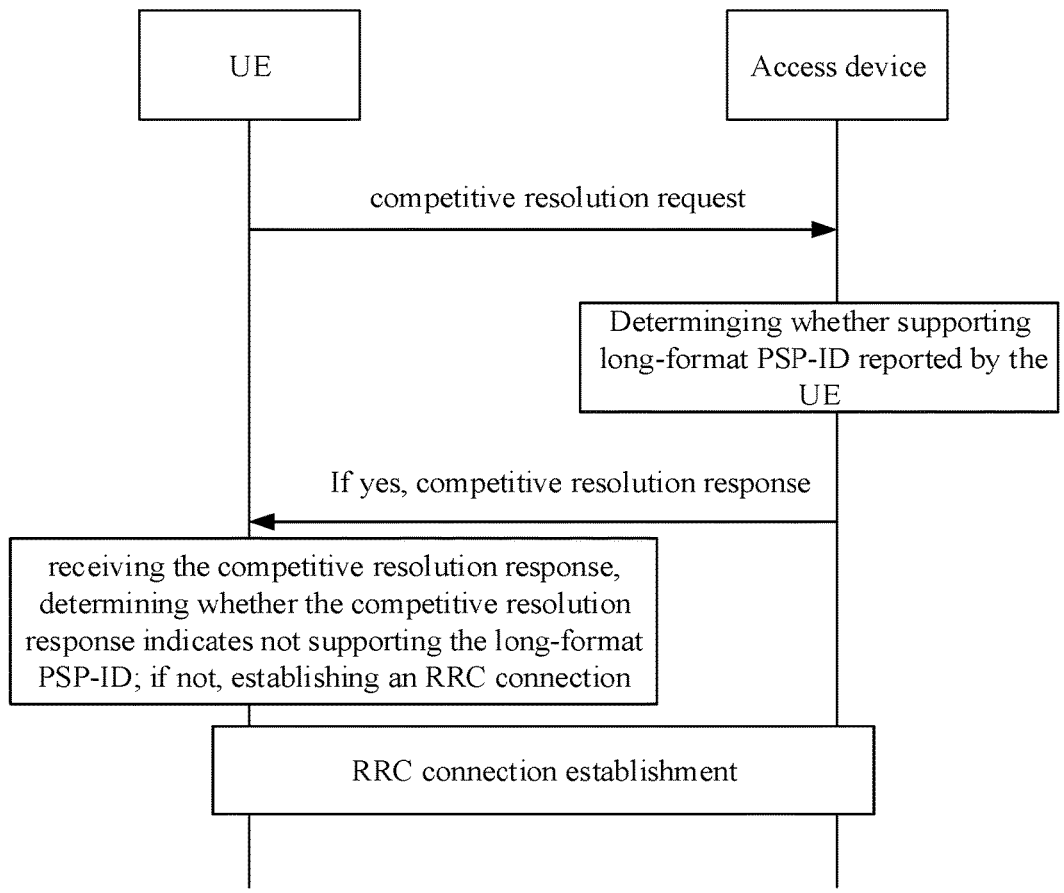
FIG. 9 is a first sequence diagram of determining whether the long-format PSP-IDs supported by the access device includes the to-be-accessed long-format PSP-ID and subsequently selecting one access device for accessing the network according to the fifth embodiment of the present disclosure.

Referring to FIG. 9, when the UE reports the long-format PSP-ID to be accessed through a competitive resolution request message of the random access process, if the access device determines that the long-format PSP-IDs supported by the access device do not include the above received long-format PSP-ID, the access device rejects the UE to access and then sends a competitive resolution response message to the UE, where the competitive resolution response message indicates not supporting the long-format PSP-ID to be accessed by the UE. If the access device determines that the long-format PSP-IDs supported by the access device include the above received long-format PSP-ID, the access device allows the UE to access and then sends a competitive resolution response message to the UE, where the competitive resolution response message does not include indication information of not supporting the long-format PSP-ID to be accessed by the UE. When the competitive resolution response message carries an identifier of not supporting the long-format PSP-ID to be accessed by the UE, the UE determines that the access device actually does not support the long-format PSP-ID to be accessed, does not initiate an RRC connection establishment to the access device, and then re-selects another access device to access the network. Otherwise, the UE determines that the access device supports the long-format PSP-ID to be accessed, and initiates an RRC connection establishment to the access device. In actual implementation, the UE may enable the competitive resolution request message to include requesting for instruction of long-format PSP-IDs, so that the access device may transmit long-format PSP-IDs actually supported by the access device in the competitive resolution response message, to serve as reference information for subsequent UE's selection of other long-format PSP-ID.

Figure 10:
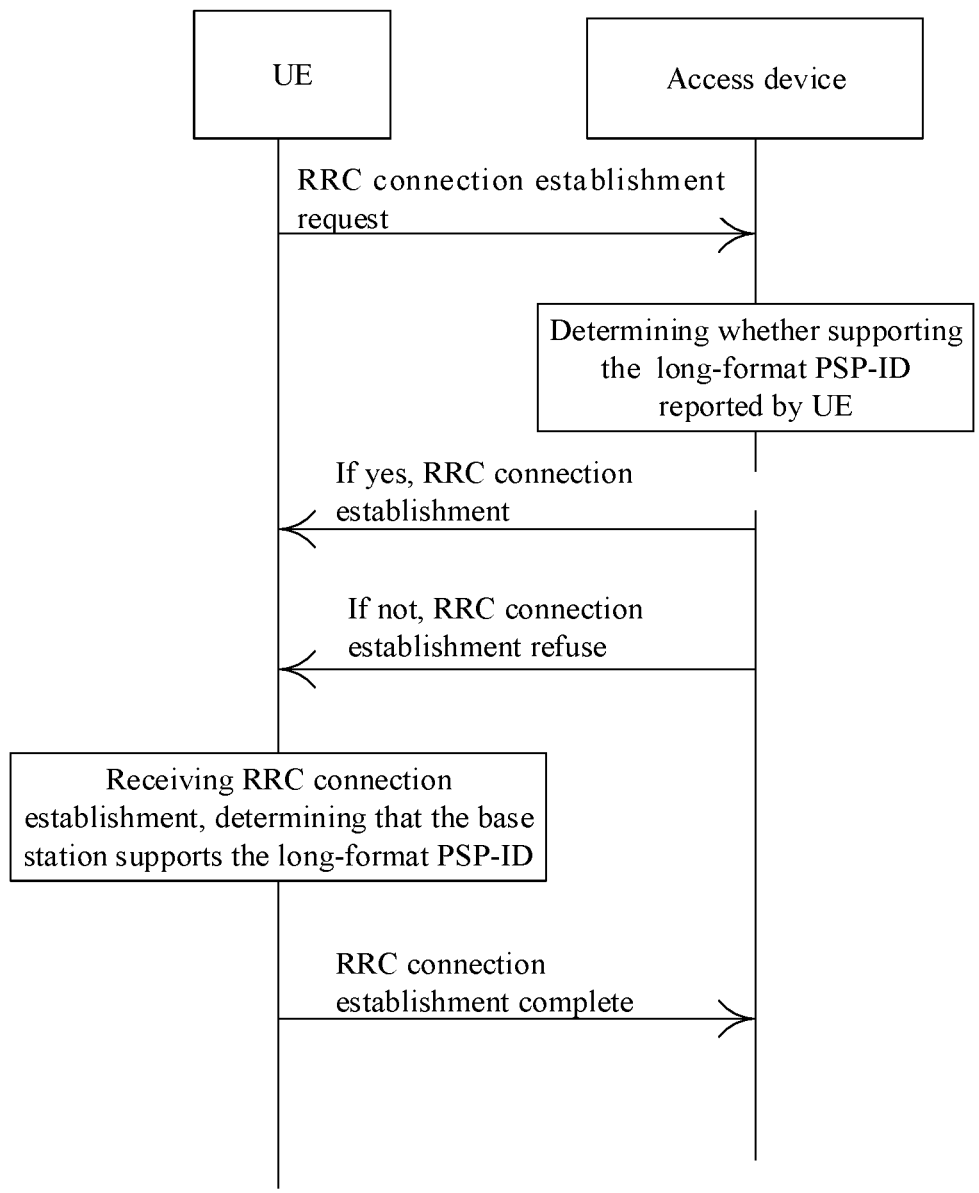
FIG. 10 is a second sequence diagram of determining whether the long-format PSP-IDs supported by the access device includes the to-be-accessed long-format PSP-ID and subsequently selecting one access device for accessing the network according to the fifth embodiment of the present disclosure.

Referring to FIG. 10, when the UE reports the long-format PSP-ID to be accessed in an RRC connection establishment request message, if the access device determines that the long-format PSP-IDs supported by the access device do not include the above received long-format PSP-ID, the access device rejects the UE to access and then sends an RRC connection rejection message to the UE. The RRC connection rejection message may include the refusal reason that the long-format PSP-ID is not supported. If the access device determines that the long-format PSP-IDs supported by the access device include the above received long-format PSP-ID, the access device allows the UE to access and then sends an RRC connection setup message to the UE. When the UE receives the RRC connection rejection message carrying the refusal reason that the long-format PSP-ID is not supported, the UE determines that the access device actually does not support the long-format PSP-ID to be accessed, and re-selects another access device to access the network. In actual implementation, the UE may enable the RRC connection establishment request message to include requesting for instruction of long-format PSP-IDs, so that the access device may transmit long-format PSP-IDs actually supported by the access device in the RRC connection setup message, to serve as reference information for subsequent UE's selection of other long-format PSP-ID.

Figure 11:
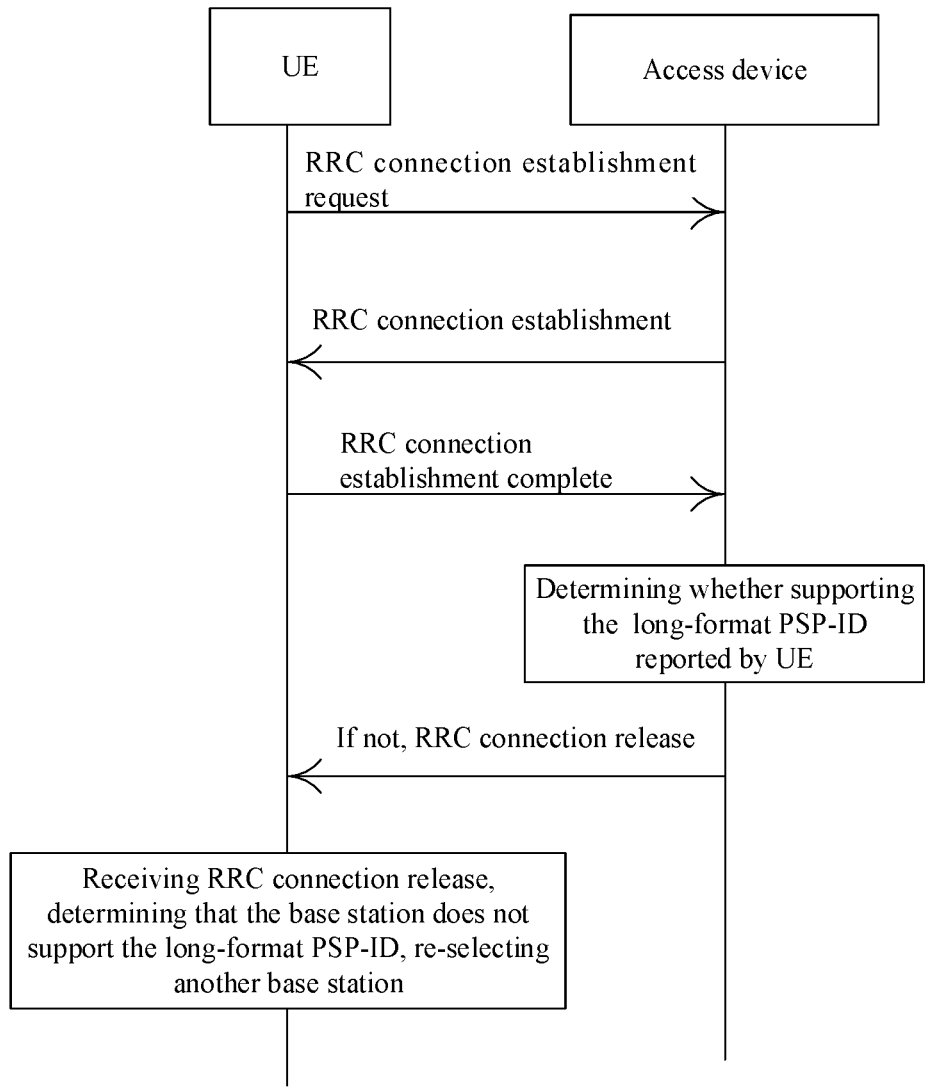
FIG. 11 is a third sequence diagram of determining whether the long-format PSP-IDs supported by the access device includes the to-be-accessed long-format PSP-ID and subsequently selecting one access device for accessing the network according to the fifth embodiment of the present disclosure.

Referring to FIG. 11, when the UE reports the long-format PSP-ID to be accessed in an RRC connection establishment complete message, if the access device determines that the long-format PSP-IDs supported by the access device do not include the above received long-format PSP-ID, the access device initiates RRC connection release and sends an RRC connection release message to the UE. The RRC connection release message may include a release reason that the long-format PSP-ID is not supported. Otherwise, the access device allows the UE to access. When the UE receives the RRC connection release message carrying the refusal reason that the long-format PSP-ID is not supported, the UE determines that the access device actually does not support the long-format PSP-ID to be accessed, releases the RRC connection and then re-selects another access device to access the network. In actual implementation, the UE may enable the RRC connection establishment complete message to include requesting for instruction of long-format PSP-IDs, so that the access device may transmit long-format PSP-IDs actually supported by the access device in the RRC connection release message or a specified RRC message, to serve as reference information for subsequent UE's selection of other long-format PSP-ID.

In this embodiment, after the UE initially selects the access device, the UE may obtain the long-format PSP-IDs actually supported by the access device, and match the long-format PSP-IDs actually supported by the access device with the long-format PSP-ID to be accessed, and finally select one matched access device for access, thereby further improving network access success rate. This embodiment can effectively avoid signaling overhead caused by network rejection when the UE requests access to the long-format PSP-ID that the network does not support.

Sixth Embodiment

The same content as the above embodiment is not elaborated in this embodiment. This embodiment provides one way about how a UE determines whether long-format PSP-IDs supported by the first access device include a long-format first PSP-ID of a service provider to be accessed. The specific way includes: sending a first request message to the first access device, where the first request message is used to request the first access device to transmit long-format PSP-IDs of the service provider supported by the first access device; receiving a first response message sent from the first access device, where the first response message includes the long-format PSP-IDs of the service provider supported by the first access device; determining whether the long-format PSP-IDs supported by the first access device include the long-format first PSP-ID of the service provider to be accessed. For example, the first request message may be sent to the first access device through an RRC connection establishment request message, a competitive resolution request message or an RRC connection establishment complete message.

Figure 12:
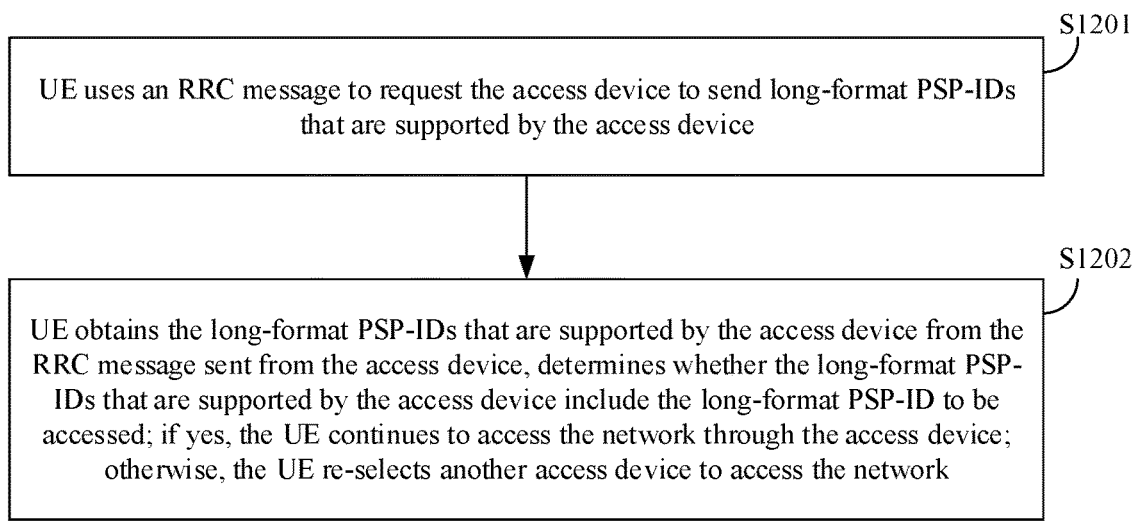
FIG. 12 is a flow chart of how a UE determines whether long-format PSP-IDs supported by a base station includes a to-be-accessed long-format PSP-ID and subsequently selects one base station for accessing a network according to a sixth embodiment of the present disclosure.

Referring to FIG. 12, FIG. 12 is a flow chart of how a UE determines whether long-format PSP-IDs supported by an access device includes a to-be-accessed long-format PSP-ID and subsequently selects one access device for accessing a network, which includes the following steps.

At step S1201, the UE uses an RRC message to request the access device to send long-format PSP-IDs that are supported by the access device.

After it is preliminarily determined that the access device may support the long-format PSP-ID to be accessed by the UE, the UE initiates random access to the access device and initiates RRC connection establishment. The UE may use a specific RRC message contained in a competitive resolution request message of the random access process to request for long-format PSP-IDs that are supported by the access device, or the UE may use an RRC connection establishment request message or an RRC connection establishment complete message to request for long-format PSP-IDs that are supported by the access device.

At step S1202, the UE obtains the long-format PSP-IDs that are supported by the access device from the RRC message sent from the access device, determines whether the long-format PSP-IDs that are supported by the access device include the long-format PSP-ID to be accessed; if yes, the UE continues to access the network through the access device; otherwise, the UE re-selects another access device to access the network.

When the access device receives the above RRC message carrying a request for the long-format PSP-IDs that are supported by the access device, the access device may send the long-format PSP-IDs that are actually supported by the access device.

Figure 13:
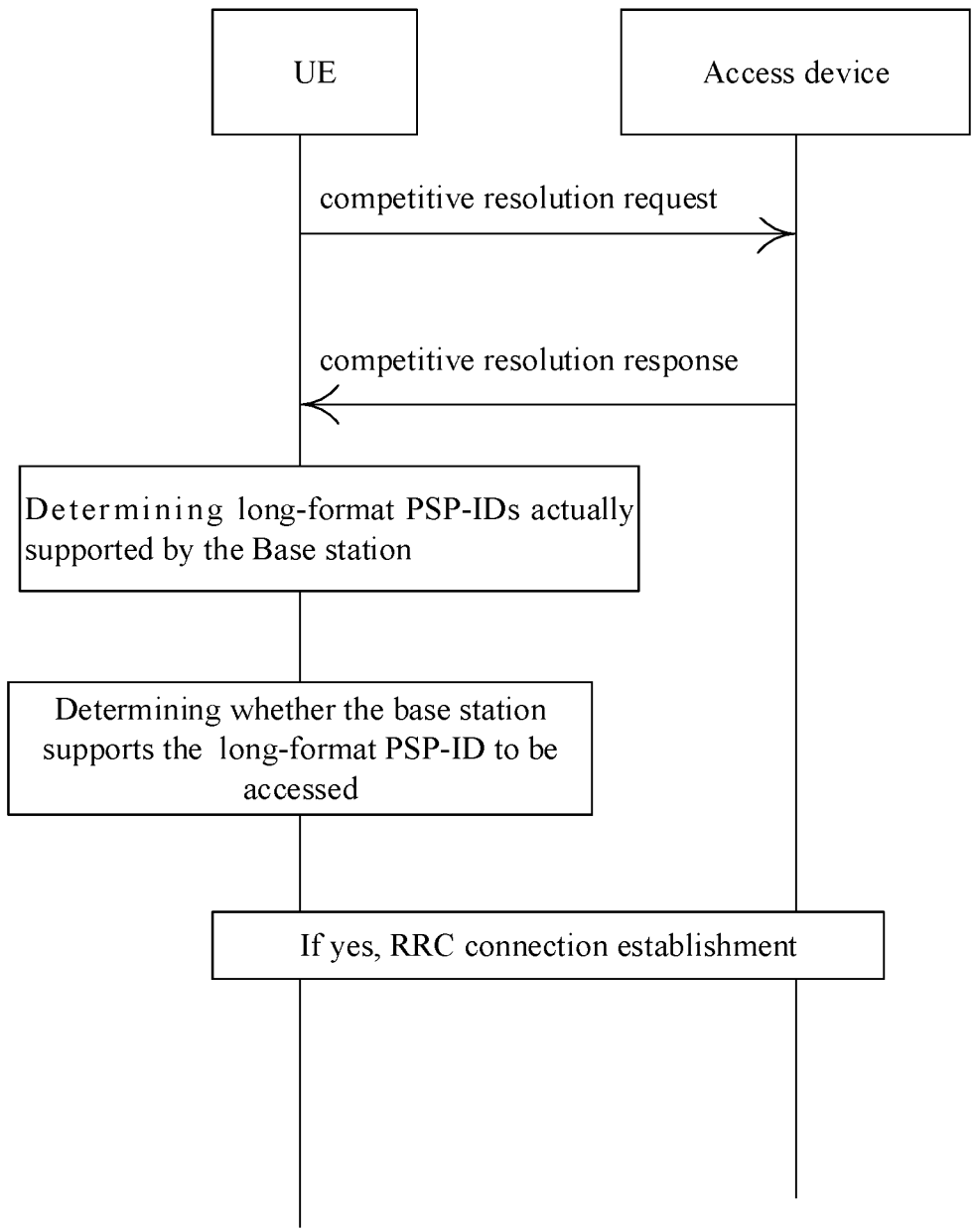
FIG. 13 is a first sequence diagram of how the UE determines whether the long-format PSP-IDs supported by the base station includes the to-be-accessed long-format PSP-ID and subsequently selects one base station for accessing the network according to the sixth embodiment of the present disclosure.

Referring to FIG. 13, when the UE uses a competitive resolution request message of the random access process to request for the long-format PSP-IDs that are supported by the access device, for example, after receiving the competitive resolution request message from the UE, the access device may send the long-format PSP-IDs that are actually supported by the access device in a competitive resolution response message. The UE obtains the long-format PSP-IDs that are supported by the access device from the competitive resolution response message, determines whether the long-format PSP-IDs that are supported by the access device include the long-format PSP-ID to be accessed; if yes, the UE continues to initiate an RRC connection establishment and access the network through the access device; otherwise, the UE re-selects another access device to access network.

Figure 14:
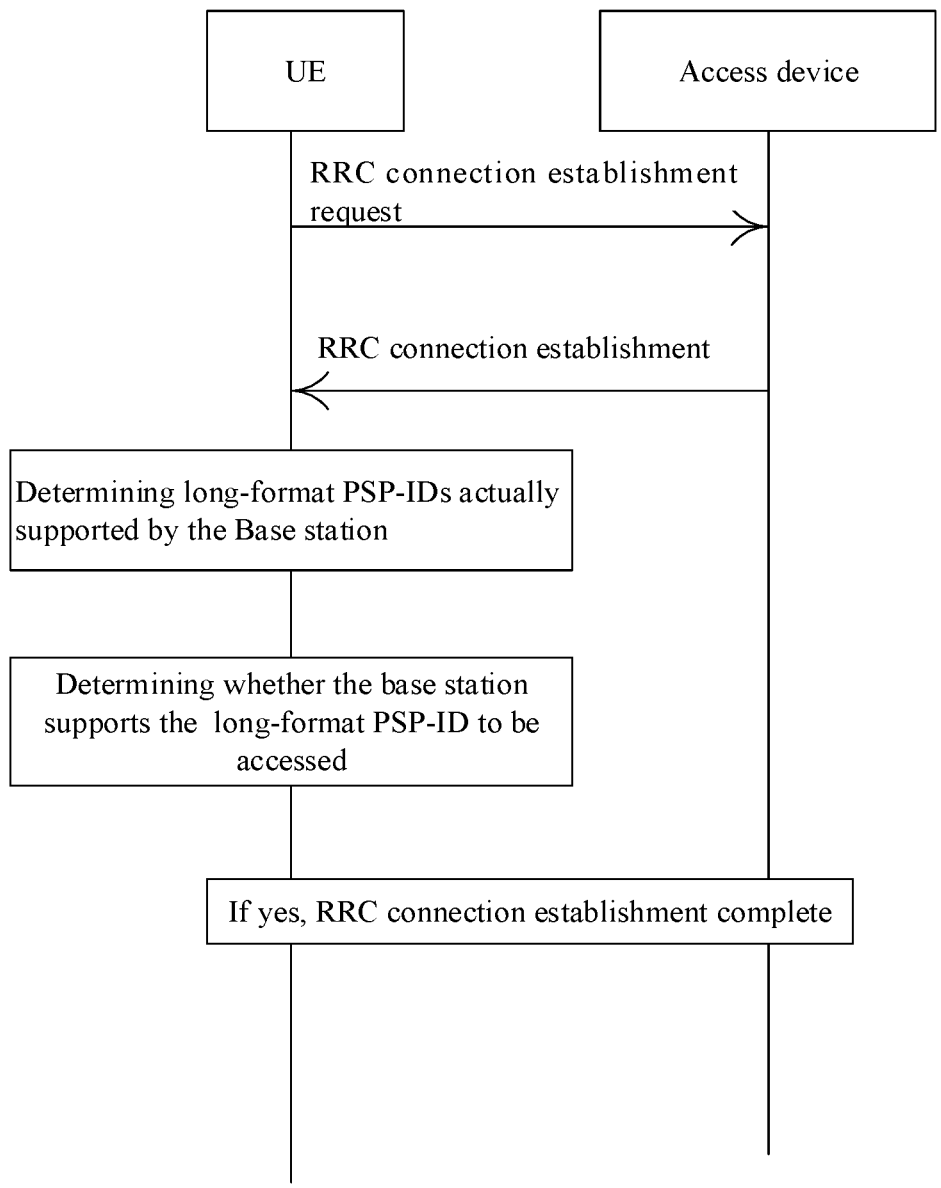
FIG. 14 is a second sequence diagram of how the UE determines whether the long-format PSP-IDs supported by the base station includes the to-be-accessed long-format PSP-ID and subsequently selects one base station for accessing the network according to the sixth embodiment of the present disclosure.

Referring to FIG. 14, when the UE uses an RRC connection establishment request message to request for the long-format PSP-IDs that are supported by the access device, the access device may send the long-format PSP-IDs that are actually supported by the access device to the UE in an RRC connection establishment message. The UE obtains the long-format PSP-IDs that are supported by the access device from the RRC connection establishment message, determines whether the long-format PSP-IDs that are supported by the access device include the long-format PSP-ID to be accessed; if yes, the UE sends an RRC connection establishment complete message to the access device to complete the RRC connection; otherwise, the UE does not send the RRC connection establishment complete message to the access device and re-selects another access device to access network.

Figure 15:
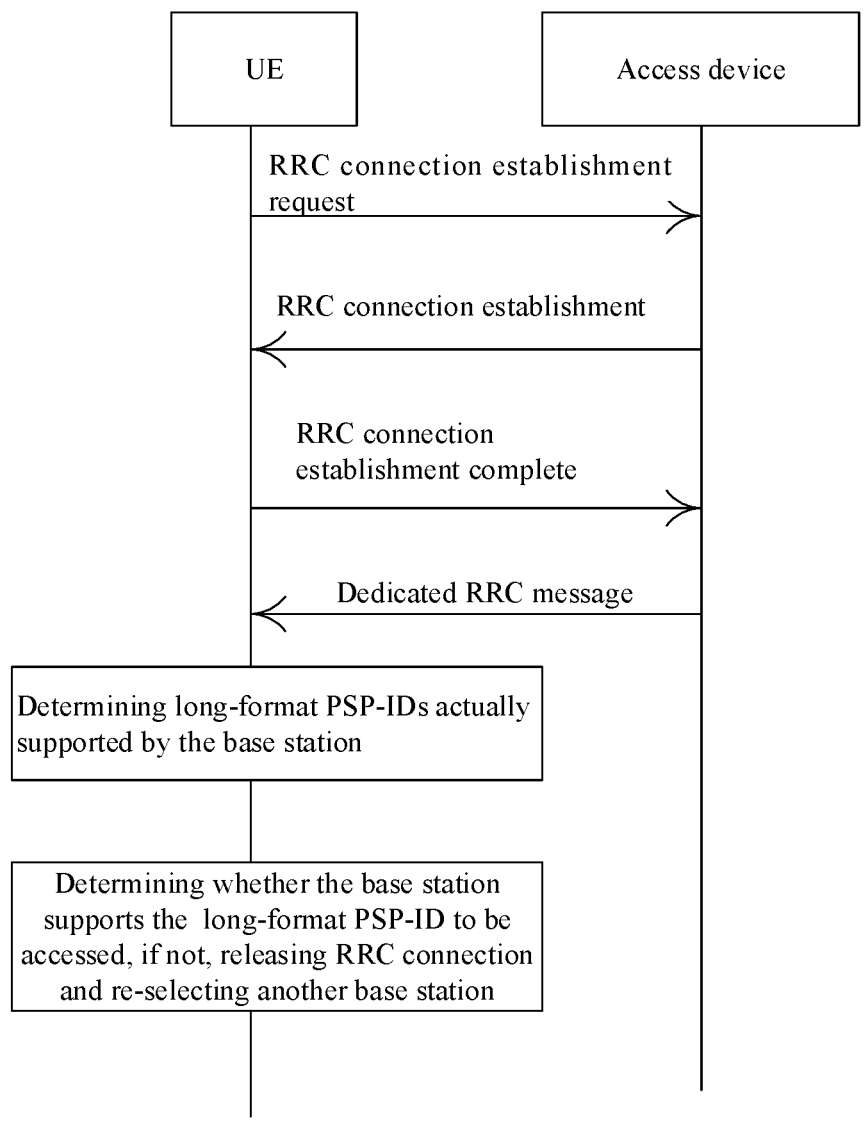
FIG. 15 is a third sequence diagram of how the UE determines whether the long-format PSP-IDs supported by the base station includes the to-be-accessed long-format PSP-ID and subsequently selects one base station for accessing the network according to the sixth embodiment of the present disclosure.

Referring to FIG. 15, when the UE uses an RRC connection establishment request message to request for the long-format PSP-IDs that are supported by the access device, the access device may send the long-format PSP-IDs that are actually supported by the access device to the UE in a specified dedicated RRC message. The UE obtains the long-format PSP-IDs that are supported by the access device from the specified dedicated RRC message, determines whether the long-format PSP-IDs that are supported by the access device include the long-format PSP-ID to be accessed; if yes, the UE continues to access the network through the access device; otherwise, the UE releases the RRC connection with the access device and re-selects another access device to access the network.

In this embodiment, after the UE initially selects the access device, the UE may obtain the long-format PSP-IDs actually supported by the access device, and match the long-format PSP-IDs actually supported by the access device with the long-format PSP-ID to be accessed, and finally select one matched access device for access, thereby further improving network access success rate. This embodiment can effectively avoid signaling overhead caused by network rejection when the UE requests access to the long-format PSP-ID that the network does not support.

Seventh Embodiment

Figure 16:
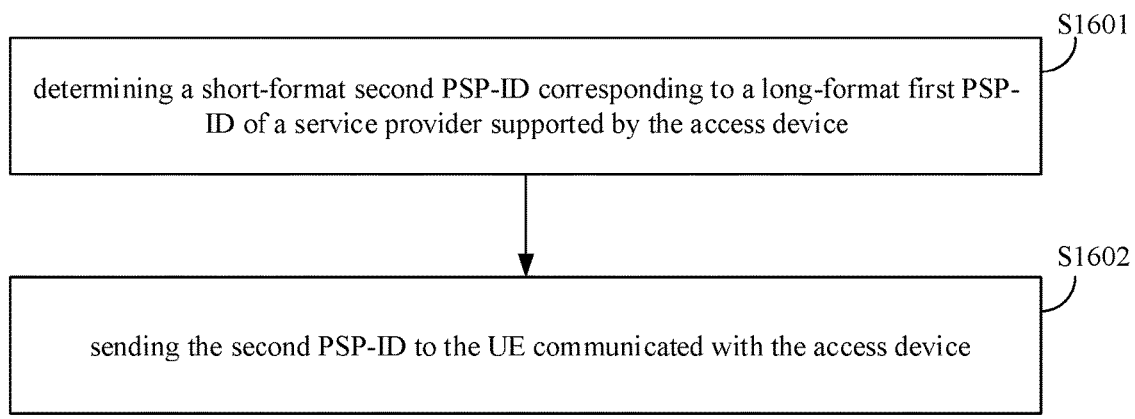
FIG. 16 is a flow chart of a method for providing service provider identity according to a seventh embodiment of the present disclosure.

Referring to FIG. 16, which shows a method for providing service provider identity, the method may be executed by an execution body such as a user equipment, and specifically includes the following steps.

The step S1601 is to determine a short-format second PSP-ID corresponding to a long-format first PSP-ID of a service provider supported by the access device, and then proceed to step S1602.

Optionally, in this embodiment, the access device may determine the short-format second PSP-ID in the following four ways.

First way, the access device obtains mapping relationship between a long-format PSP-ID and a short-format PSP-ID of a service provider from system configuration information; then, based on the mapping relationship, the access device determines the short-format second PSP-ID corresponding to the long-format first PSP-ID of the service provider supported by the access device. For example, the access device such as a base station may extract the mapping relationship between the long-format PSP-ID and the short-format PSP-ID from an OAM database. Based on the long-format PSP-ID that is supported by the base station, the base station obtains the corresponding short-format second PSP-ID, and transmits the above short-format second PSP-ID in the system broadcast message. In order to save radio resources, in the system configuration information, each short-format PSP-ID may be set to be corresponding to one or more long-format PSP-IDs. For example, two long-format PSP-IDs including "Alibaba Group" and "Alibaba Shop" are corresponding to one short-format PSP-ID, i.e., "Alibaba".

Second way, based on unified algorithm agreed by the network (such as the MulteFire network), the access device may calculate the short-format second PSP-ID corresponding to the long-format first PSP-ID of the service provider supported by the access device. Optionally, the unified algorithm agreed by the MulteFire network may be the Hash algorithm. Of course, specific algorithms are not limited in this embodiment.

Third way, a corresponding short-format second PSP-ID may be generated based on a value extracted from a specified position of the long-format first PSP-ID of the service provider supported by the access device. It should be noted that, the above specified position is not limited in this embodiment.

Fourth way, a specified portion (for example, the front portion) of the long-format first PSP-ID supported by the access device is taken as the corresponding short-format second PSP-ID. It should be noted that, the above specified portion is not limited in this embodiment.

Of course, in actual implementation, the second-format second PSP-ID may also be determined in other way in addition to the above four ways.

The step S1602 is to send the second PSP-ID to the UE communicated with the access device.

It should be noted that, when the access device obtains the short-format second PSP-ID corresponding to the long-format PSP-ID supported by the access device, the access device sends one or more short-format PSP-IDs in system broadcasting. A quantity of the short-format PSP-IDs sent by the access device is limited and is set by the network configuration information. When the quantity of the short-format PSP-IDs to be sent by the access device exceeds a number threshold, the access device may send the short-format PSP-IDs with higher priority. The priority of the short-format PSP-ID depends on the priority of the corresponding long-format PSP-ID. For example, the access device may prioritize sending short-format PSP-IDs corresponding to long-format PSP-IDs which take the MF network to which the base station belongs as "home" network.

In this embodiment, after the UE initially selects the access device, the UE may obtain the long-format PSP-IDs actually supported by the access device, and match the long-format PSP-IDs actually supported by the access device with the long-format PSP-ID to be accessed, and finally select one matched access device for access, thereby further improving network access success rate. This embodiment can effectively avoid signaling overhead caused by network rejection when the UE requests access to the long-format PSP-ID that the network does not support.

Eighth Embodiment

Figure 17:
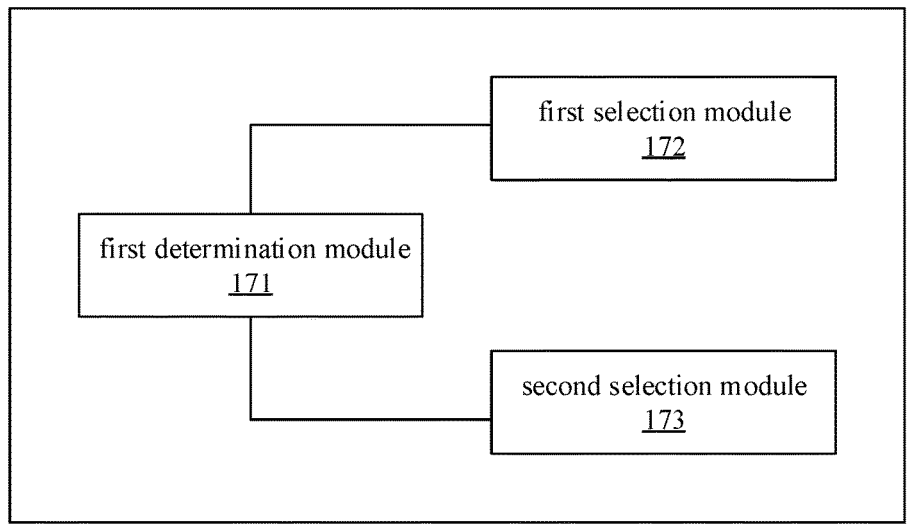
FIG. 17 is a block diagram of an apparatus for providing service provider identity according to an eighth embodiment of the present disclosure.

Referring to FIG. 17, FIG. 17 shows an apparatus 170 for providing service provider identity, and the apparatus 170 may be applied to a UE and includes: a first determination module 171 configured to determine a short-format second PSP-ID corresponding to a long-format first PSP-ID of a service provider to be accessed; a first selection module 172 configured to obtain a short-format third PSP-ID sent from a first access device; when the third PSP-ID includes the second PSP-ID, select the first access device to access the service provider; and/or, a second selection module 173 configured to obtain the short-format third PSP-ID sent from the first access device, determine a long-format fourth PSP-ID that is supported by the first access device and is corresponding to the third PSP-ID; when the fourth PSP-ID includes the first PSP-ID, select the first access device to access the service provider.

Optionally, the first selection module includes a first receiving unit; the second selection module includes a second receiving unit. The first receiving unit and the second receiving unit are configured to receive a notification message sent from the first access device. The notification message carries the short-format third PSP-ID sent from the first access device.

Optionally, the first determination module includes a first determining unit configured to obtain mapping relationship between a long-format PSP-ID and a short-format PSP-ID of a service provider; based on the mapping relationship, determine the short-format second PSP-ID corresponding to the long-format first PSP-ID of the service provider to be accessed by the UE; or, calculate the short-format second PSP-ID corresponding to the long-format first PSP-ID of the service provider supported by the access device; or, generate a corresponding short-format second PSP-ID based on a value extracted from a specified position of the long-format first PSP-ID of the service provider supported by the access device; or, take a specified portion of the long-format first PSP-ID of the service provider to be accessed as the corresponding short-format second PSP-ID.

Optionally, the second selection module includes a second determining unit configured to obtain mapping relationship between a long-format PSP-ID and a short-format PSP-ID of a service provider; based on the mapping relationship, determine a long-format fourth PSP-ID that is supported by the first access device and is corresponding to the third PSP-ID.

Optionally, the first determining unit includes a first mapping subunit, and the second determining unit includes a second mapping subunit. The first mapping subunit and the second mapping subunit are configured to: when accessing the network for the first time, use a network-supported, long-format fifth PSP-ID of the service provider to be accessed for registration of the UE; and, after completion of the registration, download the mapping relationship between the long-format PSP-ID and the short-format PSP-ID of the service provider from a server in the network, and then log out from the network corresponding to the fifth PSP-ID.

Optionally, the first mapping subunit and the second mapping subunit are further configured to: when accessing the network for the first time, send a first connection establishment request message to a second access device in the network; when wireless connection is established, send a first attach request message to a first mobility management entity corresponding to the second access device for registration of the UE, where the first attach request message carries the network-supported, first-format fifth PSP-ID of the service provider to be accessed.

Optionally, the first mapping subunit and the second mapping subunit are further configured to: obtain mapping relationship between the long-format PSP-ID and the short-format PSP-ID of the service provider through an NAS message.

Optionally, the first mapping subunit and the second mapping subunit are further configured to: after selecting the first access device, send a second connection establishment request message to the first access device; when wireless connection with the first access device is completed, send a second attach request NAS message to a second mobility management entity corresponding to the first access device, where the second attach request NAS message carries the long-format first PSP-ID of the service provider to be accessed; receive an attachment accepting NAS message sent from the second mobility management entity, where the attachment accepting NAS message includes the mapping relationship between the long-format PSP-ID and the short-format PSP-ID of the service provider; or, receive an attachment rejection NAS message sent from the second mobility management entity, and re-select another access device to access the service provider, where the attachment rejection NAS message includes the mapping relationship between the long-format PSP-ID and the short-format PSP-ID of the service provider.

Optionally, the apparatus further includes: a judgement module configured to determine whether long-format PSP-IDs supported by the first access device include the first PSP-ID of the service provider to be accessed; if yes, continue to access the network through the first access device; otherwise, re-select another access device to access the service provider.

Optionally, the apparatus further includes a request module. The request module is configured to, send a first request message to the first access device, where the first request message is used to request the first access device to transmit long-format PSP-IDs of the service provider supported by the first access device; receive a first response message sent from the first access device, where the first response message includes the long-format PSP-IDs of the service provider supported by the first access device; determine whether the long-format PSP-IDs supported by the first access device include the long-format first PSP-ID of the service provider to be accessed.

Optionally, the request module is further configured to send the first request message to the first access device through an RRC connection establishment request message, a competitive resolution request message or an RRC connection establishment complete message.

Optionally, the judgement module includes a judgement unit. The judgement unit is configured to, send the long-format first PSP-ID of the service provider to be accessed to the first access device; and determine whether the long-format PSP-IDs supported by the first access device include the long-format first PSP-ID of the service provider to be accessed, according to whether the first access device allows the UE to access.

Optionally, the judgement unit is configured to, send the long-format first PSP-ID of the service provider to be accessed to the first access device through a competitive resolution request message; when a received competitive resolution response message sent from the first access device indicates that the first access device does not support the long-format first PSP-ID to be accessed, determine that the long-format PSP-IDs supported by the first access device do not include the long-format first PSP-ID to be accessed; when the received competitive resolution response message sent from the first access device does not indicate that the first access device does not support the long-format first PSP-ID to be accessed, determine that the long-format PSP-IDs supported by the first access device include the long-format first PSP-ID to be accessed.

Optionally, the judgement unit is further configured to, send the long-format first PSP-ID of the service provider to be accessed to the first access device through an RRC connection establishment request message; when receiving a connection setup message returned by the first access device, determine that the long-format PSP-IDs supported by the first access device include the first PSP-ID; when receiving a connection rejection message returned by the first access device, determine that the long-format PSP-IDs supported by the first access device do not include the long-format first PSP-ID to be accessed.

Optionally, the judgement unit is further configured to, send a connection establishment complete message to the first access device, where the connection establishment complete message carries the first-format first PSP-ID of the service provider to be accessed; when a received connection release message indicates that the first access device does not support the long-format first PSP-ID of the service provider to be accessed, determine that the long-format PSP-IDs supported by the first access device do not include the long-format first PSP-ID of the service provider to be accessed.

In this embodiment, the UE first determines the short-format PSP-ID corresponding to the long-format PSP-ID of the network to be accessed; when one short-format PSP-ID sent from the access device includes the short-format PSP-ID corresponding to the long-format PSP-ID of the network to be accessed, then it is preliminarily determined that the access device may be selected to access the network. Subsequently, the UE may access this access device again to obtain the long-format PSP-IDs actually supported by the access device, and then determines whether the long-format PSP-IDs actually supported by the access device include the long-format PSP-ID to be accessed. If yes, the UE continues to access the above access device; otherwise, the US reselects another access device to access the network.

When the short-format PSP-ID sent from the access device is obtained from the received system broadcast message, the UE may initially select the access device that supports the long-format PSP-ID to be accessed, and this facilitates the UE to narrow a selection range of access devices and improves network access success rate. After the UE initially selects the access device, the UE may obtain the long-format PSP-IDs actually supported by the access device, and match the long-format PSP-IDs actually supported by the access device with the long-format PSP-ID to be accessed, and finally select one matched access device for access, thereby further improving network access success rate. This embodiment can effectively avoid signaling overhead caused by network rejection when the UE requests access to the long-format PSP-ID that the network does not support.

In one embodiment, an apparatus for providing service provider identity may include a processor and a memory coupled to the processor via an internal bus. The memory is configured to store programs and data used by the processor when performing operations. When the processor calls and executes the programs and data stored in the memory, functions of the above modules such as the first determination module 171, the first selection module 172 and the second selection module 173 can be are implemented and the same technical effects can be achieved.

Ninth Embodiment

This embodiment further provides a user equipment (UE) which includes the apparatus for providing service provider identity of the above eighth embodiment. The UE may be a mobile phone (or cell phone), or other devices that can transmit or receive wireless signals, including a user device (terminal), a personal digital assistant (PDA), a wireless modem, a wireless communication device, a handheld device, a laptop computer, a cordless telephone, a wireless local loop (WLL) station, customer premise equipment (CPE) or a mobile intelligent hotspot that can convert mobile signals to WiFi signals, smart appliances, or other devices that can communicate with mobile communication network spontaneously without human operation.

Tenth Embodiment

Figure 18:
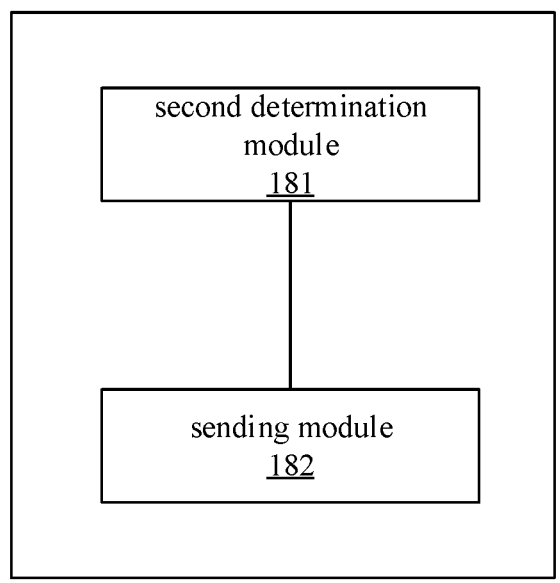
FIG. 18 is a block diagram of an apparatus for providing service provider identity according to a tenth embodiment of the present disclosure

Referring to FIG. 18, FIG. 18 shows an apparatus 180 for providing service provider identity, and the apparatus 180 may be applied to an access device and includes: a second determination module 181 configured to determine a short-format second PSP-ID corresponding to a long-format first PSP-ID of a service provider supported by the access device; a sending module 182 configured to send the second PSP-ID to the UE communicated with the access device.

Optionally, the sending module 182 is further configured to, obtain mapping relationship between a long-format PSP-ID and a short-format PSP-ID of a service provider; based on the mapping relationship, determine the short-format PSP-ID corresponding to the long-format first PSP-ID of the service provider supported by the access device; or, calculate the short-format second PSP-ID corresponding to the long-format first PSP-ID of the service provider supported by the access device; or, generate a corresponding short-format second PSP-ID based on a value extracted from a specified position of the long-format first PSP-ID of the service provider supported by the access device; or, take a specified portion of the long-format first PSP-ID of the service provider to be accessed by the UE as the corresponding short-format second PSP-ID.

Optionally, the sending module 182 is further configured to, when the quantity of the second PSP-IDs to be sent exceeds a number threshold, sequentially send the second PSP-IDs to the UE coupled to the access device according to priorities of the second PSP-IDs to be sent. The priority of the second PSP-ID depends on the priority of the corresponding first PSP-ID.

In this embodiment, the UE first determines the short-format PSP-ID corresponding to the long-format PSP-ID of the network to be accessed; when one short-format PSP-ID sent from the access device includes the short-format PSP-ID corresponding to the long-format PSP-ID of the network to be accessed, then it is preliminarily determined that the access device may be selected to access the network. Subsequently, the UE may access this access device again to obtain the long-format PSP-IDs actually supported by the access device, and then determines whether the long-format PSP-IDs actually supported by the access device include the long-format PSP-ID to be accessed. If yes, the UE continues to access the above access device; otherwise, the US reselects another access device to access the network.

In one embodiment, an apparatus for providing service provider identity may include a processor and a memory coupled to the processor via an internal bus. The memory is configured to store programs and data used by the processor when performing operations. When the processor calls and executes the programs and data stored in the memory, functions of the above modules such as the second determination module 181 and the sending module 182 can be are implemented and the same technical effects can be achieved.

Eleventh Embodiment

This embodiment further provides an access device which includes the apparatus for providing service provider identity of the above tenth embodiment. The access device (which may also be referred as MF access device) may be a base station. Of course, it should be understood that the above base station may be in a variety of forms, may be a Macro Base Station, a Pico Base Station, a Node B (which is the name of name of the 3G mobile base station), an enhanced base station (ENB), a Home enhanced base station (Femto eNB, Home eNode B, Home eNB or HNEB), a relay station, an access point, a Remote Radio Unit (RRU), a Remote Radio Head (RRH).

It should be understood that "one embodiment" or "an embodiment" as used throughout the specification means that a particular feature, structure or characteristic relating to an embodiment is included in at least one embodiment of the present disclosure. Thus, "in one embodiment" or "in an embodiment" appearing in various places throughout the specification may not necessarily refer to the same embodiment. In addition, these particular features, structures or characteristics may be combined in any suitable manner in one or more embodiments.

In various embodiments of the present disclosure, it should be understood that sizes of sequence numbers of the above processes do not mean orders of execution, and the orders of execution of various processes should be determined by their functions and internal logic, and should not constitute any limitation on the implementation process of the embodiments of the present disclosure.

In addition, the terms "system" and "network" are often used interchangeably herein.

It should be understood that the term "and/or" herein is merely used to describe an association relationship of associated objects, indicating that there may be three relationships, for example, A and/or B which may represent three situations including: A exists separately, both A and B exist, and B exists separately. In addition, the character "/" herein generally indicates that relationship between contextual associated objects is "or".

In the embodiments provided herein, it should be understood that "B corresponding to A" means that B is associated with A, and B can be determined according to A. However, it should also be understood that determining B according to A does not mean that B is determined only based on A, and that B can also be determined based on A and/or other information.

In the several embodiments provided in the present application, it should be understood that the disclosed method and apparatus may be implemented in other manners. For example, the device embodiments described above are merely illustrative. For example, division of the units is only a logical function division. In actual implementation, there may be another division manner, for example, multiple units or components may be combined or may be integrated into another system, or some features may be ignored or not executed. In addition, the coupling or direct coupling or communication connection shown or discussed may be an indirect coupling or communication connection through some interface, device or unit, and may be electrical, mechanical or other forms.

In addition, each functional unit in various embodiments of the present disclosure may be integrated into one processing unit, or each unit may be physically included separately, or two or more units may be integrated into one unit. The above integrated unit may be implemented in the form of hardware or in the form of hardware plus software functional units.

The above-described integrated unit implemented in the form of a software functional unit may be stored in a computer readable storage medium. The above software functional unit is stored in a storage medium and includes a plurality of instructions for causing a computer device (which may be a personal computer, a server, or a network device, etc.) to perform part of steps of the transceiving method of the various embodiments of the present disclosure. The foregoing storage medium includes: a U disk, a mobile hard disk, a read-only memory (ROM), a random access memory (RAM), a magnetic disk, an optical disk or various media that can store program codes.

The above are merely the preferred embodiments of the present disclosure and shall not be used to limit the scope of the present disclosure. It should be noted that, a person skilled in the art may make improvements and modifications without departing from the principle of the present disclosure, and these improvements and modifications shall also fall within the scope of the present disclosure.

Embodiments of the present disclosure provide: A1. A method for providing service provider identity, applied to a user equipment (UE), including: determining a second-format second participating service provider identity (PSP-ID) corresponding to a first-format first PSP-ID of a service provider to be accessed; obtaining a second-format third PSP-ID sent from a first access device; when the third PSP-ID includes the second PSP-ID, selecting the first access device to access the service provider; or, obtaining the second-format third PSP-ID sent from the first access device, determining a first-format fourth PSP-ID that is supported by the first access device and is corresponding to the third PSP-ID; when the fourth PSP-ID includes the first PSP-ID, selecting the first access device to access the service provider.

A2. The method of A1, wherein the obtaining a second-format third PSP-ID sent from a first access device includes: receiving a notification message sent from the first access device, wherein the notification message carries the second-format third PSP-ID sent from the first access device.

A3. The method of A1, wherein the determining a second-format second participating service provider identity (PSP-ID) corresponding to a first-format first PSP-ID of a service provider to be accessed, includes: obtaining mapping relationship between the first-format PSP-ID and the second-format PSP-ID of the service provider; based on the mapping relationship, determining the second-format second PSP-ID corresponding to the first-format first PSP-ID of the service provider to be accessed by the UE; or, calculating the second-format second PSP-ID corresponding to the first-format first PSP-ID of the service provider supported by the access device; or, generating the corresponding second-format second PSP-ID based on a parameter extracted from a specified position of the first-format first PSP-ID of the service provider supported by the access device; or, taking a specified portion of the first-format first PSP-ID of the service provider to be accessed as the corresponding second-format second PSP-ID.

A4. The method of A1, wherein the determining a first-format fourth PSP-ID that is supported by the first access device and is corresponding to the third PSP-ID, includes: obtaining mapping relationship between the first-format PSP-ID and the second-format PSP-ID of the service provider; based on the mapping relationship, determining the first-format fourth PSP-ID that is supported by the first access device and is corresponding to the third PSP-ID.

A5. The method of A3 or A4, wherein the obtaining mapping relationship between the first-format PSP-ID and the second-format PSP-ID of the service provider, includes: when accessing a network for the first time, using a network-supported, first-format fifth PSP-ID of the service provider to be accessed for registration of the UE; after completion of the registration, downloading the mapping relationship between the first-format PSP-ID and the second-format PSP-ID of the service provider from a server in the network, and then logging out from the network corresponding to the fifth PSP-ID.

A6. The method of A5, wherein when accessing a network for the first time, using a network-supported, first-format fifth PSP-ID of the service provider to be accessed for registration of the UE, includes: when accessing the network for the first time, sending a first connection establishment request message to a second access device in the network; when wireless connection is established, sending a first attach request message to a first mobility management entity corresponding to the second access device for registration of the UE; wherein the first attach request message carries the network-supported, first-format fifth PSP-ID of the service provider to be accessed.

A7. The method of A3 or A4, wherein the obtaining mapping relationship between the first-format PSP-ID and the second-format PSP-ID of the service provider, includes: obtaining the mapping relationship between the first-format PSP-ID and the second-format PSP-ID of the service provider through an NAS message.

A8. The method of A7, wherein the obtaining the mapping relationship between the first-format PSP-ID and the second-format PSP-ID of the service provider through an NAS message, includes: after the UE selects the first access device, sending a second connection establishment request message to the first access device; when wireless connection with the first access device is completed, sending a second attach request NAS message to a second mobility management entity corresponding to the first access device, wherein the second attach request NAS message carries the first-format first PSP-ID of the service provider to be accessed; receiving an attachment accepting NAS message sent from the second mobility management entity, wherein the attachment accepting NAS message includes the mapping relationship between the first-format PSP-ID and the second-format PSP-ID of the service provider; or, receiving an attachment rejection NAS message sent from the second mobility management entity, and re-selecting another access device to access the service provider, wherein the attachment rejection NAS message includes the mapping relationship between the first-format PSP-ID and the second-format PSP-ID of the service provider.

A9. The method of A1, further including: determining whether first-format PSP-IDs supported by the first access device include the first-format first PSP-ID of the service provider to be accessed; if yes, continuing to access the service provider through the first access device; otherwise, re-selecting another access device to access the service provider.

A10. The method of A9, wherein the determining whether first-format PSP-IDs supported by the first access device include the first-format first PSP-ID of the service provider to be accessed, includes: sending a first request message to the first access device, wherein the first request message is configured to request the first access device to transmit first-format PSP-IDs of the service provider supported by the first access device; receiving a first response message sent from the first access device, wherein the first response message includes the first-format PSP-IDs of the service provider supported by the first access device; determining whether the first-format PSP-IDs supported by the first access device include the first-format first PSP-ID of the service provider to be accessed.

A11. The method of A10, wherein the sending a first request message to the first access device, includes: sending the first request message to the first access device through an RRC connection establishment request message, a competitive resolution request message or an RRC connection establishment complete message.

A12. The method of A9, wherein the determining whether the first-format PSP-IDs supported by the first access device include the first-format first PSP-ID of the service provider to be accessed, includes: sending the first-format first PSP-ID of the service provider to be accessed to the first access device; and determining whether the first-format PSP-IDs supported by the first access device include the first-format first PSP-ID of the service provider to be accessed according to whether the first access device allows the UE to access.

A13. The method of A12, wherein the sending the first-format first PSP-ID of the service provider to be accessed to the first access device; and determining whether the first-format PSP-IDs supported by the first access device include the first-format first PSP-ID of the service provider to be accessed according to whether the first access device allows the UE to access, includes: sending the first-format first PSP-ID of the service provider to be accessed to the first access device through a competitive resolution request message; when a received competitive resolution response message sent from the first access device indicates that the first access device does not support the first-format first PSP-ID of the service provider to be accessed, determining that the first-format PSP-IDs supported by the first access device do not include the first-format first PSP-ID of the service provider to be accessed; when the received competitive resolution response message sent from the first access device does not indicate that the first access device does not support the first-format first PSP-ID of the service provider to be accessed, determining that the first-format PSP-IDs supported by the first access device include the first-format first PSP-ID of the service provider to be accessed.

A14. The method of A12, wherein the sending the first-format first PSP-ID of the service provider to be accessed to the first access device; and determining whether the first-format PSP-IDs supported by the first access device include the first-format first PSP-ID of the service provider to be accessed according to whether the first access device allows the UE to access, includes: sending the first-format first PSP-ID of the service provider to be accessed to the first access device through an RRC connection establishment request message; when receiving a connection setup message returned by the first access device, determining that the first-format PSP-IDs supported by the first access device include the first PSP-ID; when receiving a connection rejection message returned by the first access device, determining that the first-format PSP-IDs supported by the first access device do not include the first PSP-ID.

A15. The method of A12, wherein the sending the first-format first PSP-ID of the service provider to be accessed to the first access device; and determining whether the first-format PSP-IDs supported by the first access device include the first-format first PSP-ID of the service provider to be accessed according to whether the first access device allows the UE to access, includes: sending a connection establishment complete message to the first access device, wherein the connection establishment complete message carries the first-format first PSP-ID of the service provider to be accessed; when a received connection release message indicates that the first access device does not support the first-format first PSP-ID of the service provider to be accessed, determining that the first-format PSP-IDs supported by the first access device do not include the first-format first PSP-ID of the service provider to be accessed.

Embodiments of the present disclosure further provide:

B16. A method for providing service provider identity, applied to an access device, including: determining a second-format second participating service provider identity (PSP-ID) corresponding to a first-format first PSP-ID of a service provider supported by the access device; and sending the second PSP-ID to a user equipment (UE) connected with the access device.

B17. The method of B16, wherein the determining a second-format second participating service provider identity (PSP-ID) corresponding to a first-format first PSP-ID of a service provider supported by the access device, includes: obtaining mapping relationship between the first-format PSP-ID and the second-format PSP-ID of the service provider; based on the mapping relationship, determining the second-format second PSP-ID corresponding to the first-format first PSP-ID of the service provider supported by the access device; or, calculating the second-format second PSP-ID corresponding to the first-format first PSP-ID of the service provider supported by the access device; or, generating a corresponding second-format second PSP-ID based on a parameter extracted from a specified position of the first-format first PSP-ID of the service provider supported by the access device; or, taking a specified portion of the first-format first PSP-ID of the service provider to be accessed by the UE as the corresponding second-format second PSP-ID.

B18. The method of B16, wherein the sending the second PSP-ID to a user equipment (UE) connected with the access device, includes: when a quantity of second PSP-IDs to be sent exceeds a preset number threshold, sequentially sending the second PSP-IDs to the UE connected with the access device according to priorities of the second PSP-IDs to be sent; the priority of the second PSP-ID depends on the priority of the corresponding first PSP-ID.

B19. The method of any one of B16 to B18, wherein one or more first-format PSP-IDs of the service provider are corresponding to one second-format PSP-ID, and a length of the second-format PSP-ID is less than that of the first-format PSP-ID.

Embodiments of the present disclosure further provide:

C20. An apparatus for providing service provider identity, applied to a user equipment (UE), including: a first determination module configured to determine a second-format second participating service provider identity (PSP-ID) corresponding to a first-format first PSP-ID of a service provider to be accessed; a first selection module configured to obtain a second-format third PSP-ID sent from a first access device; when the third PSP-ID includes the second PSP-ID, select the first access device to access the service provider; and/or, a second selection module configured to obtain the second-format third PSP-ID sent from the first access device, determine a first-format fourth PSP-ID that is supported by the first access device and is corresponding to the third PSP-ID; when the fourth PSP-ID includes the first PSP-ID, select the first access device to access the service provider.

C21. The apparatus of C20, wherein the first determination module includes a first receiving unit, the second selection module includes a second receiving unit; the first receiving unit and the second receiving unit are configured to receive a notification message sent from the first access device; wherein the notification message carries the second-format third PSP-ID sent from the first access device.

C22. The apparatus of C20, wherein the first determination module includes a first determining unit and the first determining unit is configured to, obtain mapping relationship between the first-format PSP-ID and the second-format PSP-ID of the service provider; based on the mapping relationship, determine the second-format second PSP-ID corresponding to the first-format first PSP-ID of the service provider to be accessed by the UE; or, calculate the second-format second PSP-ID corresponding to the first-format first PSP-ID of the service provider supported by the access device; or, generate the corresponding second-format second PSP-ID based on a parameter extracted from a specified position of the first-format first PSP-ID of the service provider supported by the access device; or, take a specified portion of the first-format first PSP-ID of the service provider to be accessed as the corresponding second-format second PSP-ID.

C23. The apparatus of C22, wherein the second selection module includes a second determining unit configured to, obtain mapping relationship between the first-format PSP-ID and the second-format PSP-ID of the service provider; based on the mapping relationship, determine the first-format fourth PSP-ID that is supported by the first access device and is corresponding to the third PSP-ID.

C24. The apparatus of C22 or C23, wherein the first determining unit includes a first mapping subunit, and the second determining unit includes a second mapping subunit; the first mapping subunit and the second mapping subunit are configured to: when accessing a network for the first time, use a network-supported, first-format fifth PSP-ID of the service provider to be accessed for registration of the UE; after completion of the registration, download the mapping relationship between the first-format PSP-ID and the second-format PSP-ID of the service provider from a server in the network, and then log out from the network corresponding to the fifth PSP-ID.

C25. The apparatus of C24, wherein the first mapping subunit and the second mapping subunit are further configured to: when accessing the network for the first time, send a first connection establishment request message to a second access device in the network; when wireless connection is established, send a first attach request message to a first mobility management entity corresponding to the second access device for registration of the UE; wherein the first attach request message carries the network-supported, first-format fifth PSP-ID of the service provider to be accessed.

C26. The apparatus of C24, wherein the first mapping subunit and the second mapping subunit are further configured to obtain the mapping relationship between the first-format PSP-ID and the second-format PSP-ID of the service provider through an NAS message.

C27. The apparatus of C26, wherein the first mapping subunit and the second mapping subunit are further configured to, after the UE selects the first access device, send a second connection establishment request message to the first access device; when wireless connection with the first access device is completed, send a second attach request NAS message to a second mobility management entity corresponding to the first access device, wherein the second attach request NAS message carries the first-format first PSP-ID of the service provider to be accessed; receive an attachment accepting NAS message sent from the second mobility management entity, wherein the attachment accepting NAS message includes the mapping relationship between the first-format PSP-ID and the second-format PSP-ID of the service provider; or, receive an attachment rejection NAS message sent from the second mobility management entity, and re-select another access device to access the service provider, wherein the attachment rejection NAS message includes the mapping relationship between the first-format PSP-ID and the second-format PSP-ID of the service provider.

C28. The apparatus of C20, further including a judgement module; wherein the judgement module is configured to, determine whether first-format PSP-IDs supported by the first access device include the first-format first PSP-ID of the service provider to be accessed; if yes, continue to access the service provider through the first access device; otherwise, re-select another access device to access the service provider.

C29. The apparatus of C28, further including a request module; wherein the request module is configured to, send a first request message to the first access device, wherein the first request message is configured to request the first access device to transmit first-format PSP-IDs of the service provider supported by the first access device; receive a first response message sent from the first access device, wherein the first response message includes the first-format PSP-IDs of the service provider supported by the first access device; determine whether the first-format PSP-IDs supported by the first access device include the first-format first PSP-ID of the service provider to be accessed.

C30. The apparatus of C28, wherein the request module is further configured to send the first request message to the first access device through an RRC connection establishment request message, a competitive resolution request message or an RRC connection establishment complete message.

C31. The apparatus of C28, wherein the judgement module includes a judgement unit and the judgement unit is configured to, send the first-format first PSP-ID of the service provider to be accessed to the first access device; and determine whether the first-format PSP-IDs supported by the first access device include the first-format first PSP-ID of the service provider to be accessed according to whether the first access device allows the UE to access.

C32. The apparatus of C31, wherein the judgement unit is further configured to, send the first-format first PSP-ID of the service provider to be accessed to the first access device through a competitive resolution request message; when a received competitive resolution response message sent from the first access device indicates that the first access device does not support the first-format first PSP-ID of the service provider to be accessed, determine that the first-format PSP-IDs supported by the first access device do not include the first-format first PSP-ID of the service provider to be accessed; when the received competitive resolution response message sent from the first access device does not indicate that the first access device does not support the first-format first PSP-ID of the service provider to be accessed, determine that the first-format PSP-IDs supported by the first access device include the first-format first PSP-ID of the service provider to be accessed.

C33. The apparatus of C31, wherein the judgement unit is further configured to, send the first-format first PSP-ID of the service provider to be accessed to the first access device through an RRC connection establishment request message; when receiving a connection setup message returned by the first access device, determine that the first-format PSP-IDs supported by the first access device include the first PSP-ID; when receiving a connection rejection message returned by the first access device, determine that the first-format PSP-IDs supported by the first access device do not include the first PSP-ID.

C34. The apparatus of C31, wherein the judgement unit is further configured to, send a connection establishment complete message to the first access device, wherein the connection establishment complete message carries the first-format first PSP-ID of the service provider to be accessed; when a received connection release message indicates that the first access device does not support the first-format first PSP-ID of the service provider to be accessed, determine that the first-format PSP-IDs supported by the first access device do not include the first-format first PSP-ID of the service provider to be accessed.

Embodiments of the present disclosure further provide:
D35. A user equipment including the apparatus of any one of C20 to C34.

Embodiments of the present disclosure further provide:
E36. An apparatus for providing service provider identity, applied to an access device, including: a second determination module configured to determine a second-format second participating service provider identity (PSP-ID) corresponding to a first-format first PSP-ID of a service provider supported by the access device; and a sending module configured to send the second PSP-ID to a user equipment (UE) connected with the access device.

E37. The apparatus of E36, wherein the second determination module is configured to, obtain mapping relationship between the first-format PSP-ID and the second-format PSP-ID of the service provider; based on the mapping relationship, determine the second-format second PSP-ID corresponding to the first-format first PSP-ID of the service provider supported by the access device; or, calculate the second-format second PSP-ID corresponding to the first-format first PSP-ID of the service provider supported by the access device; or, generate a corresponding second-format second PSP-ID based on a parameter extracted from a specified position of the first-format first PSP-ID of the service provider supported by the access device; or, take a specified portion of the first-format first PSP-ID of the service provider to be accessed by the UE as the corresponding second-format second PSP-ID.

E38. The apparatus of E36, wherein the sending module is further configured to, when a quantity of second PSP-IDs to be sent exceeds a preset number threshold, sequentially send the second PSP-IDs to the UE connected with the access device according to priorities of the second PSP-IDs to be sent; the priority of the second PSP-ID depends on the priority of the corresponding first PSP-ID.

E39. The apparatus of any one of E36 to E38, wherein one or more first-format PSP-IDs of the service provider are corresponding to one second-format PSP-ID, and a length of the second-format PSP-ID is less than that of the first-format PSP-ID.

Embodiments of the present disclosure further provide:
40. An access device including the apparatus of any one of E36 to E39.

What is claimed is:

1. A method for providing service provider identity, applied to a user equipment (UE), comprising:
   determining a second-format second participating service provider identity (PSP-ID) corresponding to a first-format first PSP-ID of a service provider to be accessed;
   obtaining second-format third PSP-ID(s) sent from a first access device; when the third PSP-ID(s) includes the second PSP-ID, selecting the first access device to access the service provider; or,
   obtaining the second-format third PSP-ID(s) sent from the first access device, determining first-format fourth PSP-ID(s) that is supported by the first access device and is corresponding to the third PSP-ID(s); when the fourth PSP-ID(s) includes the first PSP-ID, selecting the first access device to access the service provider.

2. The method of claim 1, wherein the obtaining second-format third PSP-ID(s) sent from a first access device includes:
   receiving a notification message sent from the first access device, wherein the notification message carries the second-format third PSP-ID(s) sent from the first access device.

3. The method of claim 1, wherein the determining a second-format second participating service provider identity (PSP-ID) corresponding to a first-format first PSP-ID of a service provider to be accessed, includes:

obtaining mapping relationship between the first-format PSP-ID and the second-format PSP-ID of the service provider; based on the mapping relationship, determining the second-format second PSP-ID corresponding to the first-format first PSP-ID of the service provider to be accessed by the UE; or, calculating the second-format second PSP-ID corresponding to the first-format first PSP-ID of the service provider supported by the access device; or, generating the corresponding second-format second PSP-ID based on a parameter extracted from a specified position of the first-format first PSP-ID of the service provider supported by the access device; or, taking a specified portion of the first-format first PSP-ID of the service provider to be accessed as the corresponding second-format second PSP-ID.

4. The method of claim 1, wherein the determining first-format fourth PSP-ID(s) that is supported by the first access device and is corresponding to the third PSP-ID(s), includes:

obtaining mapping relationship between the first-format PSP-ID and the second-format PSP-ID of the service provider;

based on the mapping relationship, determining the first-format fourth PSP-ID(s) that is supported by the first access device and is corresponding to the third PSP-ID(s).

5. The method of claim 3 or 1, wherein the obtaining mapping relationship between the first-format PSP-ID and the second-format PSP-ID of the service provider, includes:

when accessing a network for the first time, using a network-supported, first-format fifth PSP-ID of the service provider to be accessed for registration of the UE; after completion of the registration, downloading the mapping relationship between the first-format PSP-ID and the second-format PSP-ID of the service provider from a server in the network, and then logging out from the network corresponding to the fifth PSP-ID.

6. The method of claim 5, wherein when accessing a network for the first time, using a network-supported, first-format fifth PSP-ID of the service provider to be accessed for registration of the UE, includes:

when accessing the network for the first time, sending a first connection establishment request message to a second access device in the network; when wireless connection is established, sending a first attach request message to a first mobility management entity corresponding to the second access device for registration of the UE; wherein the first attach request message carries the network-supported, first-format fifth PSP-ID of the service provider to be accessed.

7. The method of claim 3, wherein the obtaining mapping relationship between the first-format PSP-ID and the second-format PSP-ID of the service provider, includes: obtaining the mapping relationship between the first-format PSP-ID and the second-format PSP-ID of the service provider through an NAS message.

8. The method of claim 7, wherein the obtaining the mapping relationship between the first-format PSP-ID and the second-format PSP-ID of the service provider through an NAS message, includes:

after the UE selects the first access device, sending a second connection establishment request message to the first access device; when wireless connection with the first access device is completed, sending a second attach request NAS message to a second mobility management entity corresponding to the first access device, wherein the second attach request NAS message carries the first-format first PSP-ID of the service provider to be accessed; receiving an attachment accepting NAS message sent from the second mobility management entity, wherein the attachment accepting NAS message includes the mapping relationship between the first-format PSP-ID and the second-format PSP-ID of the service provider; or, receiving an attachment rejection NAS message sent from the second mobility management entity, and re-selecting another access device to access the service provider, wherein the attachment rejection NAS message includes the mapping relationship between the first-format PSP-ID and the second-format PSP-ID of the service provider.

9. The method of claim 1, further comprising: determining whether first-format PSP-IDs supported by the first access device include the first-format first PSP-ID of the service provider to be accessed; if yes, continuing to access the service provider through the first access device; otherwise, re-selecting another access device to access the service provider.

10. The method of claim 9, wherein the determining whether first-format PSP-IDs supported by the first access device include the first-format first PSP-ID of the service provider to be accessed, includes:

sending a first request message to the first access device, wherein the first request message is configured to request the first access device to transmit first-format PSP-IDs of the service provider supported by the first access device; receiving a first response message sent from the first access device, wherein the first response message includes the first-format PSP-IDs of the service provider supported by the first access device; determining whether the first-format PSP-IDs supported by the first access device include the first-format first PSP-ID of the service provider to be accessed.

11. The method of claim 10, wherein the sending a first request message to the first access device, includes: sending the first request message to the first access device through an RRC connection establishment request message, a competitive resolution request message or an RRC connection establishment complete message.

12. The method of claim 9, wherein the determining whether the first-format PSP-IDs supported by the first access device include the first-format first PSP-ID of the service provider to be accessed, includes:

sending the first-format first PSP-ID of the service provider to be accessed to the first access device; and determining whether the first-format PSP-IDs supported by the first access device include the first-format first PSP-ID of the service provider to be accessed according to whether the first access device allows the UE to access.

13. The method of claim 12, wherein the sending the first-format first PSP-ID of the service provider to be accessed to the first access device; and determining whether the first-format PSP-IDs supported by the first access device include the first-format first PSP-ID of the service provider to be accessed according to whether the first access device allows the UE to access, includes:

sending the first-format first PSP-ID of the service provider to be accessed to the first access device through a competitive resolution request message; when a received competitive resolution response message sent from the first access device indicates that the first access device does not support the first-format first PSP-ID of the service provider to be accessed, determining that the first-format PSP-IDs supported by the first access device do not include the first-format first PSP-ID of the service provider to be accessed; when the received competitive resolution response message sent from the first access device does not indicate that the first access device does not support the first-format first PSP-ID of the service provider to be accessed, determining that the first-format PSP-IDs supported by the first access device include the first-format first PSP-ID of the service provider to be accessed; or, sending the first-format first PSP-ID of the service provider to be accessed to the first access device through an RRC connection establishment request message; when receiving a connection setup message returned by the first access device, determining that the first-format PSP-IDs supported by the first access device include the first PSP-ID; when receiving a connection rejection message returned by the first access device, determining that the first-format PSP-IDs supported by the first access device do not include the first PSP-ID; or, sending a connection establishment complete message to the first access device, wherein the connection establishment complete message carries the first-format first PSP-ID of the service provider to be accessed; when a received connection release message indicates that the first access device does not support the first-format first PSP-ID of the service provider to be accessed, determining that the first-format PSP-IDs supported by the first access device do not include the first-format first PSP-ID of the service provider to be accessed.

14. A method for providing service provider identity, applied to an access device, comprising: determining second-format second participating service provider identity (PSP-ID)(s) corresponding to first-format first PSP-ID(s) of a service provider supported by the access device, which includes: obtaining mapping relationship between the first-format PSP-ID(s) and the second-format PSP-ID(s) of the service provider; based on the mapping relationship, determining the second-format second PSP-ID(s) corresponding to the first-format first PSP-ID(s) of the service provider supported by the access device; or, calculating the second-format second PSP-ID(s) corresponding to the first-format first PSP-ID(s) of the service provider supported by the access device; or generating corresponding second-format second PSP-ID(s) based on a parameter extracted from a specified position of the first-format first PSP-ID(s) of the service provider supported by the access device; or taking a specified portion of the first-format first PSP-ID(s) of the service provider to be accessed by the UE as the corresponding second-format second PSP-ID(s); and sending the second PSP-ID(s) to a user equipment (UE) connected with the access device.

15. The method of claim 14, wherein the sending the second PSP-ID to a user equipment (UE) connected with the access device, includes:
when a quantity of second PSP-IDs to be sent exceeds a preset number threshold, sequentially sending the second PSP-IDs to the UE connected with the access device according to priorities of the second PSP-IDs to be sent; the priority of the second PSP-ID depends on the priority of the corresponding first PSP-ID.

16. The method of claim 14, wherein one or more first-format PSP-IDs of the service provider are corresponding to one second-format PSP-ID, and a length of the second-format PSP-ID is less than that of the first-format PSP-ID.

17. A chip for providing service provider identity, applied to an access device, comprising:
a processor;
a memory;
herein the memory stores instructions executable by the processor; when the instructions are executed, the processor is configured to perform steps of the method of claim 14; and
send the second PSP-ID(s) to a user equipment (UE) connected with the access device.

18. A chip for providing service provider identity, applied to a user equipment (UE), comprising:
a processor;
a memory;
wherein the memory stores instructions executable by the processor; when the instructions are executed, the processor is configured to,
determine a second-format second participating service provider identity (PSP-ID) corresponding to a first-format first PSP-ID of a service provider to be accessed;
obtain second-format third PSP-ID(s) sent from a first access device; when the third PSP-ID(s) includes the second PSP-ID, select the first access device to access the service provider; and/or,
obtain the second-format third PSP-ID(s) sent from the first access device, determine first-format fourth PSP-ID(s) that is supported by the first access device and is corresponding to the third PSP-ID(s); when the fourth PSP-ID(s) includes the first PSP-ID, select the first access device to access the service provider.

19. A user equipment comprising the chip for providing service provider identity of claim 18.

* * * * *